(12) United States Patent
Wood et al.

(10) Patent No.: US 8,145,196 B2
(45) Date of Patent: Mar. 27, 2012

(54) CREATION AND MANAGEMENT OF VOICEMAIL GREETINGS FOR MOBILE COMMUNICATION DEVICES

(75) Inventors: Policarpo Wood, San Francisco, CA (US); Alan Cannistraro, San Francisco, CA (US); Kourtny Hicks, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1115 days.

(21) Appl. No.: 11/969,169

(22) Filed: Jan. 3, 2008

(65) Prior Publication Data

US 2009/0154669 A1 Jun. 18, 2009

Related U.S. Application Data

(60) Provisional application No. 61/014,644, filed on Dec. 18, 2007.

(51) Int. Cl.
*H04M 11/10* (2006.01)
(52) U.S. Cl. ............... 455/413; 455/415; 379/88.23
(58) Field of Classification Search .......... 455/415, 455/412.1–413; 379/88.19, 88.22–88.24
See application file for complete search history.

(56) References Cited

U.S. PATENT DOCUMENTS

| | | | | |
|---|---|---|---|---|
| 5,434,906 A * | 7/1995 | Robinson et al. | ........... | 379/88.23 |
| 5,588,042 A * | 12/1996 | Comer | ........... | 455/413 |
| 5,748,709 A * | 5/1998 | Sheerin | ........... | 379/88.22 |
| 5,884,160 A * | 3/1999 | Kanazaki | ........... | 455/413 |
| 6,631,181 B1 * | 10/2003 | Bates et al. | ........... | 379/88.18 |
| 6,795,530 B1 * | 9/2004 | Gilbert et al. | ........... | 379/76 |
| 7,043,232 B2 * | 5/2006 | Pelaez et al. | ........... | 455/412.1 |
| 7,130,649 B2 * | 10/2006 | Kwon et al. | ........... | 455/466 |
| 7,599,473 B2 * | 10/2009 | Michael et al. | ........... | 379/76 |
| 7,796,977 B2 * | 9/2010 | Vander Veen | ........... | 455/413 |
| 8,000,685 B2 * | 8/2011 | Benco et al. | ........... | 455/413 |
| 2005/0089149 A1 * | 4/2005 | Elias | ........... | 379/88.13 |
| 2006/0031326 A1 * | 2/2006 | Ovenden | ........... | 709/206 |
| 2006/0140200 A1 * | 6/2006 | Black et al. | ........... | 370/401 |
| 2006/0239419 A1 * | 10/2006 | Joseph et al. | ........... | 379/67.1 |
| 2006/0291630 A1 * | 12/2006 | Benco et al. | ........... | 379/67.1 |
| 2007/0263791 A1 * | 11/2007 | Alperin et al. | ........... | 379/67.1 |
| 2008/0045186 A1 * | 2/2008 | Black et al. | ........... | 455/413 |
| 2008/0167007 A1 * | 7/2008 | Novick et al. | ........... | 455/413 |
| 2009/0202051 A1 * | 8/2009 | Singh et al. | ........... | 379/88.19 |
| 2010/0035584 A1 * | 2/2010 | Hadinata et al. | ........... | 455/413 |
| 2010/0093329 A1 * | 4/2010 | Lee et al. | ........... | 455/415 |
| 2010/0159890 A1 * | 6/2010 | Sigmund et al. | ........... | 455/413 |
| 2010/0174787 A1 * | 7/2010 | Gupta | ........... | 709/206 |
| 2010/0297988 A1 * | 11/2010 | Kuhl et al. | ........... | 455/415 |
| 2011/0105087 A1 * | 5/2011 | Toebes et al. | ........... | 455/412.1 |

FOREIGN PATENT DOCUMENTS

WO WO 2008005924 A2 * 1/2008

* cited by examiner

*Primary Examiner* — Sharad Rampuria

(57) ABSTRACT

Methods, graphical user interfaces and devices for creation and management of voicemail greetings are disclosed. A user of a mobile communication device can create and manage multiple voicemail greetings. In one aspect, a user of a mobile communication device can create customized voicemails. The customized voicemails can be assigned to specific contacts (or groups of contacts) known to the mobile communication device. The customized voicemail greetings can also have controlled expiration dates. In another aspect, customized voicemails can be assigned to incoming calls in real-time.

40 Claims, 32 Drawing Sheets

600

| CALLER | GREETINGS |
|---|---|
| 408-555-1212 | Mom |
| 408-555-5656 | Buddies |
| 615-123-9876 | Buddies |
| 919-465-2760 | Buddies |
| 415-555-1234 | Work Team |
| 415-499-6511 | Work Team |

| GREETING | GREETING FILE LOCATION | DEFAULT |
|---|---|---|
| Default | \123456\greeting\default | |
| Vacation | \123456\greeting\vacation | ✓ |
| Out of Office | \123456\greeting\out_of_town | |
| Meeting | \123456\greeting\meeting | |
| Buddies | \123456\greeting\buddies | |
| Mom | \123456\greeting\mom | |
| Work Team | \123456\greeting\work_team | |

FIG. 6B

CREATION AND MANAGEMENT OF VOICEMAIL GREETINGS FOR MOBILE COMMUNICATION DEVICES

CROSS-REFERENCE TO OTHER APPLICATION

This application claims priority to U.S. Provisional Patent Application No. 61/014,644, filed Dec. 18, 2007, entitled "CREATION AND MANAGEMENT OF VOICEMAIL GREETINGS FOR MOBILE COMMUNICATION DEVICES", which is herein incorporated by reference.

BACKGROUND OF THE INVENTION

1. Field of the Invention

The present invention relates to voicemail greetings and, more particularly, to creation and assignment of voicemail greetings for callers to communication devices.

2. Description of the Related Art

Today, wireless service providers provide voicemail services to their wireless subscribers using mobile phones. When a caller to a mobile phone is directed to voicemail, the user receives whatever voicemail greeting has been configured for the particular mobile phone. The user of the mobile phone can record a new voicemail message, such as a vacation message when they will be away from their phone for some time. Unfortunately, however, neither mobile phones nor wireless service providers enable users of mobile phones to efficiently manage multiple voicemail greetings.

SUMMARY OF THE INVENTION

The invention relates to creation and management of voicemail greetings. A user of a mobile communication device can create and manage multiple voicemail greetings. In one aspect, a user of a mobile communication device can create customized voicemails. The customized voicemails can be assigned to specific contacts (or groups of contacts) known to the mobile communication device. The customized voicemail greetings can also have controlled expiration dates. In another aspect, customized voicemails can be assigned to incoming calls in real-time.

The invention can be implemented in numerous ways, including as a method, system, device, apparatus (including graphical user interface or computer readable medium). Several embodiments of the invention are discussed below.

As a method operable on a wireless communication device for assigning7 a voicemail greeting to a contact, one embodiment of the invention can, for example, include at least: selecting a predetermined contact; displaying a list of a plurality of predetermined voicemail greetings; receiving a selection of one of the predetermined voicemail greetings to be utilized with respect to an incoming call from the selected predetermined contact; and associating the selected of one of the predetermined voicemail greetings to the selected predetermined contact so that the selected one of the predetermined voicemail greetings can be utilized with respect to one or more incoming calls from the selected predetermined contact.

As a method operable on a wireless communication device for configuring a voicemail greeting, one embodiment of the invention can, for example, include at least: displaying a list of a plurality of predetermined voicemail greetings; receiving a selection of one of the predetermined voicemail greetings to be utilized with respect to an incoming call; and notifying the wireless service provider of the selected one of the predetermined voicemail greetings.

As a method for providing voicemail greetings to callers, one embodiment of the invention can, for example, include at least: receiving an incoming call by a caller and directed to a particular subscriber; determining whether a particular one of a plurality of voicemail greetings associated with the particular subscriber has been assigned for use with the caller; and playing the particular voicemail greeting for the caller if it is determined that the particular subscriber has assigned the particular voicemail greeting to be used with the caller.

As a graphical user interface for presentation on a display of a mobile electronic device, one embodiment of the invention can, for example, include at least a greeting screen that presents a plurality of available greetings, and a visual designator configured to designate a selected one of the available greetings to be utilized. The graphical user interface can also include a greeting creation screen configured to create a new greeting.

As a graphical user interface for presentation on a display of a mobile electronic device, another embodiment of the invention can, for example, include at least an outgoing message creation screen configured to record a custom message and schedule delivery of the custom message.

As a mobile electronic device, one embodiment of the invention includes at least: a display; a memory configured to store computer program code and data on a plurality of contacts; and a processor. The processor can be configured to assign a voicemail greeting to at least one of the contacts. The processor can execute computer program code to (i) select one or a group of the contacts, (ii) display a list of a plurality of predetermined voicemail greetings; (iii) receive a selection of one of the predetermined voicemail greetings to be utilized with respect to an incoming call from the selected one or the group of the contacts, and (iv) associate the selected of one of the predetermined voicemail greetings to the selected one or the group of the contacts so that the selected one of the predetermined voicemail greetings can be utilized with respect to incoming calls to the selected predetermined contact.

As a method for handling an incoming call, one embodiment of the invention can, for example, include at least: receiving an incoming call by a caller and directed to a particular subscriber; notifying the particular subscriber of the incoming call; receiving an indication from the particular subscriber whether the incoming call is to be answered or declined; and causing a selected audio message to be presented to the caller if the particular subscriber indicates that the incoming call is to be declined.

As a method for delivering a message to a recipient, one embodiment of the invention can, for example, include at least: scheduling a date and/or time for a message to be delivered to the recipient; recording, by a user of mobile communication device, an audio and/or video message for the recipient; and submitting the audio and/or video message for delivery at the scheduled date and/or time.

BRIEF DESCRIPTION OF THE DRAWINGS

The invention will be readily understood by the following detailed description in conjunction with the accompanying drawings, wherein like reference numerals designate like structural elements, and in which:

FIGS. 6A and 6B are exemplary greeting tables according to one embodiment of the invention.

DETAILED DESCRIPTION OF THE INVENTION

The invention relates to creation and management of voicemail greetings. A user of a mobile communication device can create and manage multiple voicemail greetings. In one aspect, a user of a mobile communication device can create customized voicemails. The customized voicemails can be assigned to specific contacts (or groups of contacts) known to the mobile communication device. The customized voicemail greetings can also have controlled expiration dates. In another aspect, customized voicemails can be assigned to incoming calls in real-time.

A mobile communication device (or wireless communication device) is a mobile electronic device that supports wireless voice communications. Examples of mobile electronic devices are a mobile phone (e.g., cellular phone), personal digital assistant (PDA), media player (e.g., music, videos, games, images), media storage device, camera, remote control, and/or the like. The mobile electronic device may also be a multi-functional device that combines two or more of these device functionalities into a single device.

Embodiments of the invention are discussed below with reference to FIGS. 1-11. However, those skilled in the art will readily appreciate that the detailed description given herein with respect to these figures is for explanatory purposes as the invention extends beyond these limited embodiments.

Figure 1:
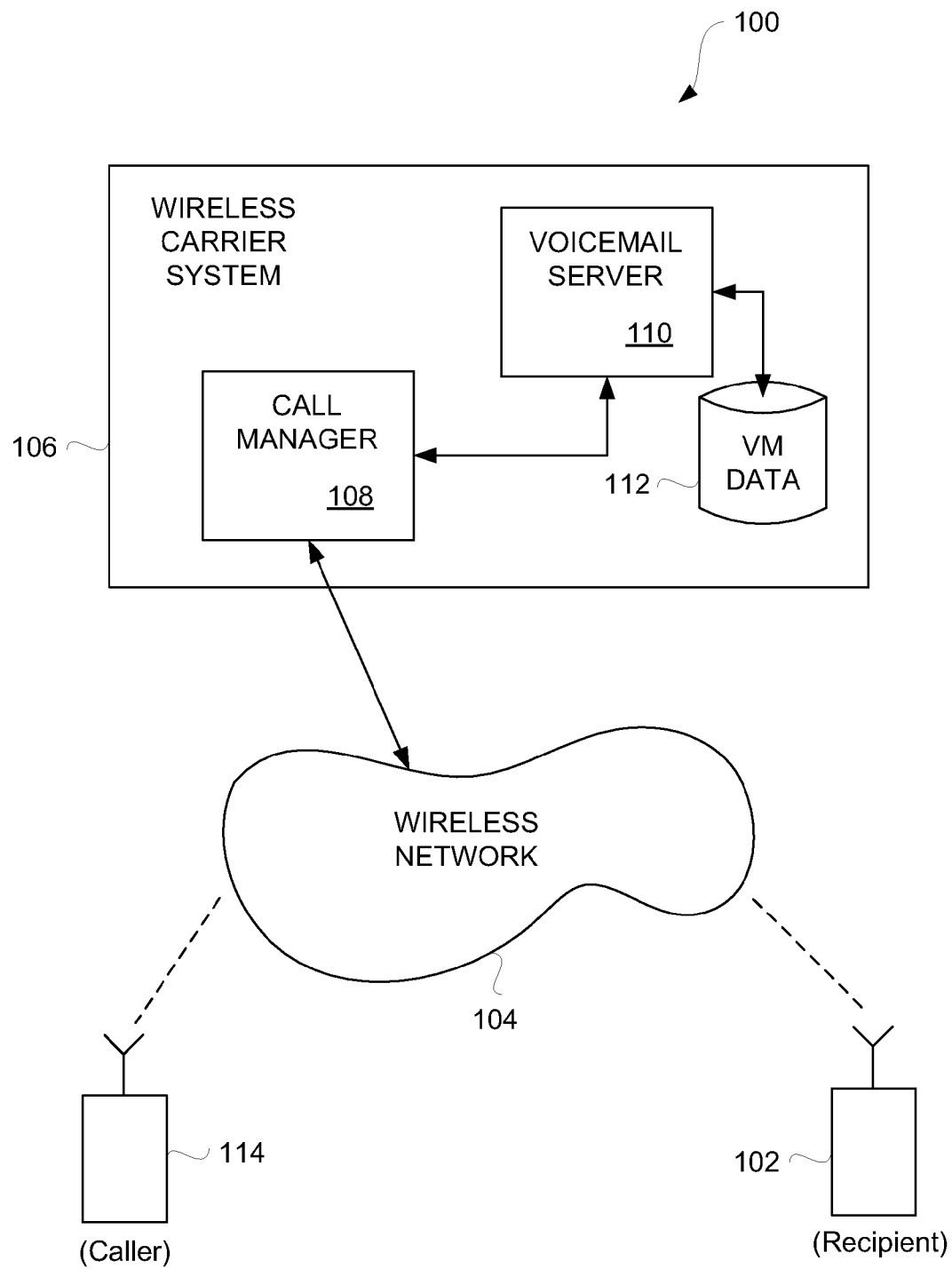
FIG. 1 is a block diagram of a voicemail system according to one embodiment of the invention.

FIG. 1 is a block diagram of a voicemail system 100 according to one embodiment of the invention. The voicemail system 100 includes a mobile communication device 102 that is associated with a subscriber of wireless network services. The subscriber is also a user of the mobile communication device 102. The voicemail system 100 couples to a wireless network 104. The voicemail system 100 can include a wireless carrier system 106 that is operatively connected to the wireless network 104.

The wireless carrier system 106 can include a call manager 108, a voicemail server 110 and voicemail data 112. The call manager 108 operates to direct calls from a calling party (caller) to a receiving party (recipient via the wireless network 104). The wireless carrier system 106 also includes a voicemail server 110 and voicemail data 112. The voicemail data 112 is utilized by the voicemail server 110. The voicemail server 110 operatively connects to the call manager 108 and/or the voicemail data 112.

The voicemail system 100 generally supports a large number of mobile communication devices. In one embodiment, a mobile communication device 114 is utilized by a caller to initiate an incoming call to the mobile communication device 102 of the recipient. The incoming call is from the mobile communication device 114 of the caller to the mobile communication device 102 of the recipient.

When the caller uses the mobile communication device 114 to initiate an incoming call with the recipient by way of the mobile communication device 102, the incoming call is directed from the mobile communication device 114 to the mobile communication device 102. The call manager 108 can participate in directing of the incoming call to the mobile communication device 102 of the recipient via the wireless network 104. When the recipient at the mobile communication device 102 does not answer the incoming call from the caller, the voicemail server 110 can receive the incoming call and provide voicemail services to the caller. In this regard, the voicemail services allow the caller to leave a voicemail message for the recipient. The voicemail server 110, however, presents a voicemail greeting to the caller by way of the wireless network 104 and the mobile communication device 114. The voicemail greeting can be one of a plurality of available voicemail greetings that can be stored in the voicemail data 112. Any voicemails that are left by callers can also be stored in the voicemail data 112. According to one embodiment of the invention, the particular voicemail greeting being presented to the caller can be dependent upon voicemail configurations that have been arranged by the recipient of the mobile communication device 102.

As discussed below, the voicemail system 110 permits the recipient of the mobile communication device 102 to assign particular voicemail greetings to particular callers, groups of callers, or both. In addition, custom voicemail greetings can be created and used by the mobile communication device 102, whereby created voicemail greetings can be transmitted to the voicemail server 110 and stored in the voicemail data 112.

Figure 2:
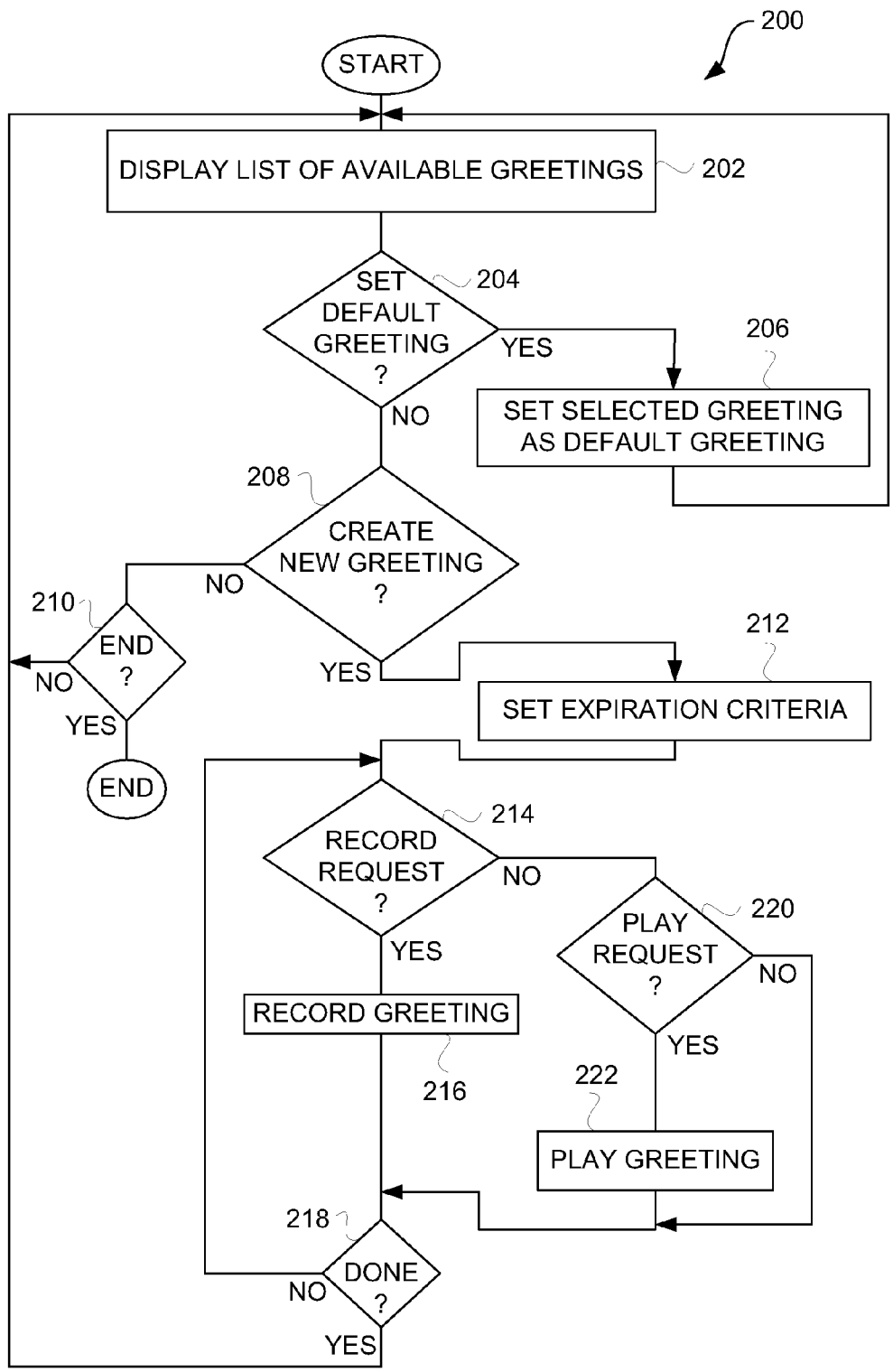
FIG. 2 is a flow diagram of a general greeting configuration process according to one embodiment of the invention.

FIG. 2 is a flow diagram of a general greeting configuration process 200 according to one embodiment of the invention. The general greeting configuration process 200 can, for example, be preformed on a mobile communication device, such as the mobile communication device 102 illustrated in FIG. 1.

The general greeting configuration process 200 can display 202 a list of available greetings. The list of available greetings is a list of those greetings, namely, voicemail greetings, that are available to be used as greetings (e.g., introductory messages) for voicemail. These available greetings can pertain to greetings previously recorded on the mobile communication device, greetings provided with the mobile communication device, or greetings made available to the mobile communication device. The list of available greetings can be displayed 202 as a list of identifiers (e.g., names, images, or icons) for the available greetings. The list of identifiers can be formed from identification information for the available greetings. The mobile communication device can store the identification information for the available greetings. However, audio data for the available greetings need not be stored on the mobile communication device.

After the list of available greetings is displayed 202, a decision 204 can determine whether a default greeting is to be set. When the decision 204 determines that a default greeting is to be set, a selected one of the available greetings can be set 206 as a default greeting. Following the block 206, the general greeting configuration process 200 can return to repeat the block 202 so that an updated list of the available greetings can be displayed.

On the other hand, when the decision 204 determines that a default greeting is not to be set at this time, a decision 208 can determine whether a new greeting is to be created at this time. When the decision 208 determines that a new greeting is not to be created at this time, a decision 210 can determine whether the general greeting configuration process 200 should end. When the decision 210 determines that the general greeting configuration process 200 should end, then the general greeting configuration process 200 can end. When the decision 210 determines that the general greeting configuration process 200 is not to end, then the general greeting configuration process 200 can return to repeat the block 202.

Alternatively, when the decision 208 determines that a new greeting is to be created, the general greeting configuration process 200 can support processing to allow the user of the mobile communication device to create a new greeting. In this regard, expiration criteria for the new greeting can be set 212. The expiration criteria can control when the new greeting is to expire. Expiration of a greeting can eliminate the greeting from being available for usage or can simply de-select in the greeting from being in use. After expiration criteria, if any, is set 212 for the new greeting, a decision 214 can determine whether a record request has been received. A record request is a request by the user of the mobile communication device to begin recording the new greeting being created. When the decision 214 determines that a record request has been received, the new greeting can be recorded 216. Here, the user of the mobile communication device can speak (or otherwise provide audio) for the new greeting that is to be recorded. The mobile communication device can include a microphone for which audio for the greeting (e.g., spoken greeting by the user) can be picked-up and recorded (and thus stored) at the mobile communication device. In doing so, the general greeting configuration process 200, although not shown, can limit the duration permitted for the greeting. For example, greetings can be limited to thirty (30) seconds. After the greeting has been recorded 216, a decision 218 can determine whether the user is done creating the new greeting. When the decision 218 determines that the user is not done creating the new greeting, the general greeting configuration process 200 can return to repeat the decision 214 and subsequent blocks.

Also, when the decision 214 determines that a record request has not been received, a decision 220 can determine whether a play request has been received. The play request allows the user of the mobile communication device to cause a previously created greeting (or other available greetings) to be played by the mobile communication device. Hence, when the decision 220 determines that a play request has been received, then the greeting being created can be played 222. On the other hand, when the decision 220 determines that a play request has not been received, the block 222 can be bypassed. Following the block 222, or its bypass, the decision 218 can be performed. When the decision 218 determines that creation of the new greeting is done, the general greeting configuration process 200 can return to repeat the block 202 so that the list of available greetings being displayed can be updated and thereafter utilized as discussed above with regard to the general greeting configuration process 200.

Figure 3A:
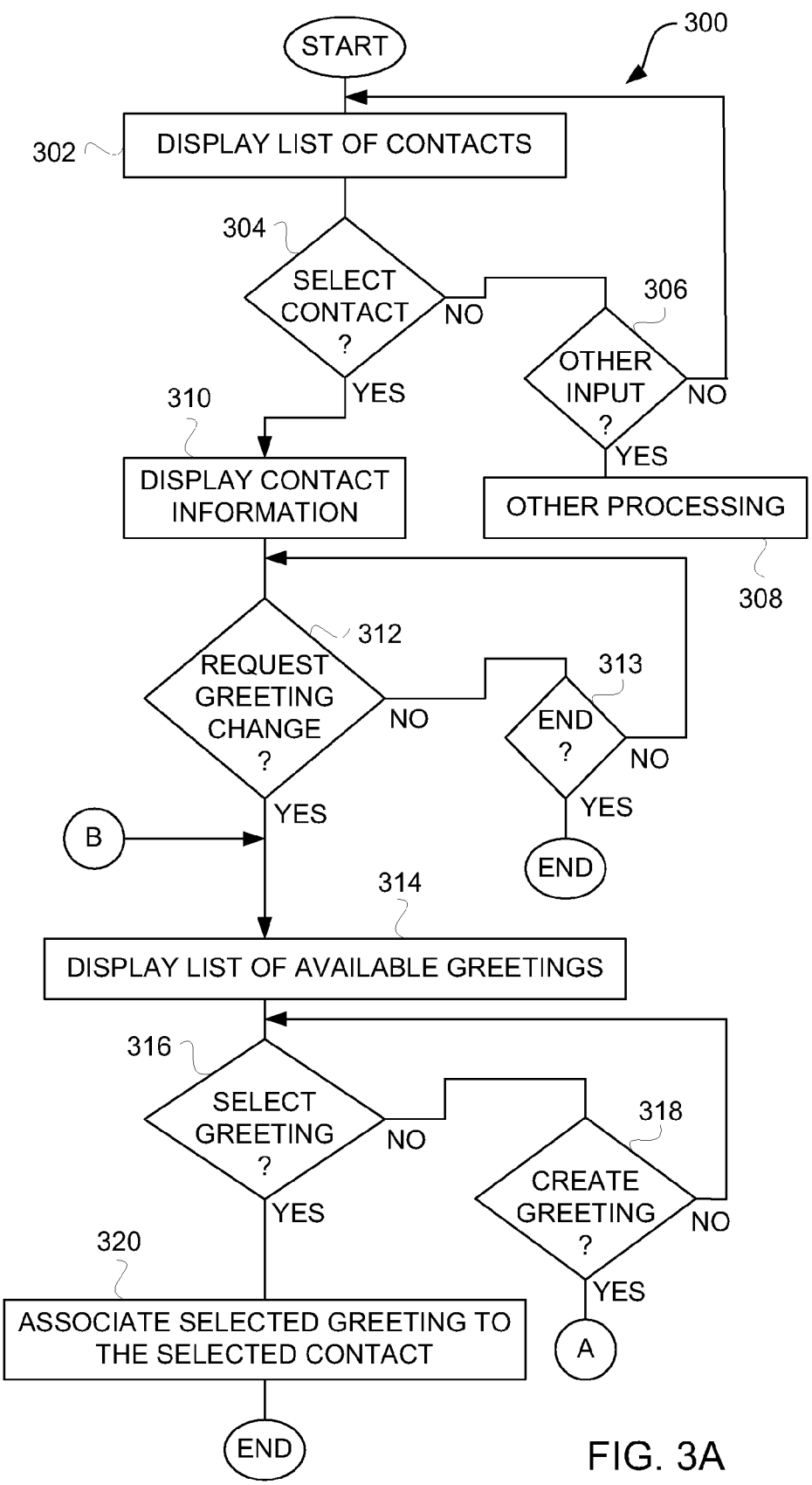
FIGS. 3A and 3B are flow diagrams of a contact greeting configuration process according to one embodiment of the invention.
Figure 3B:
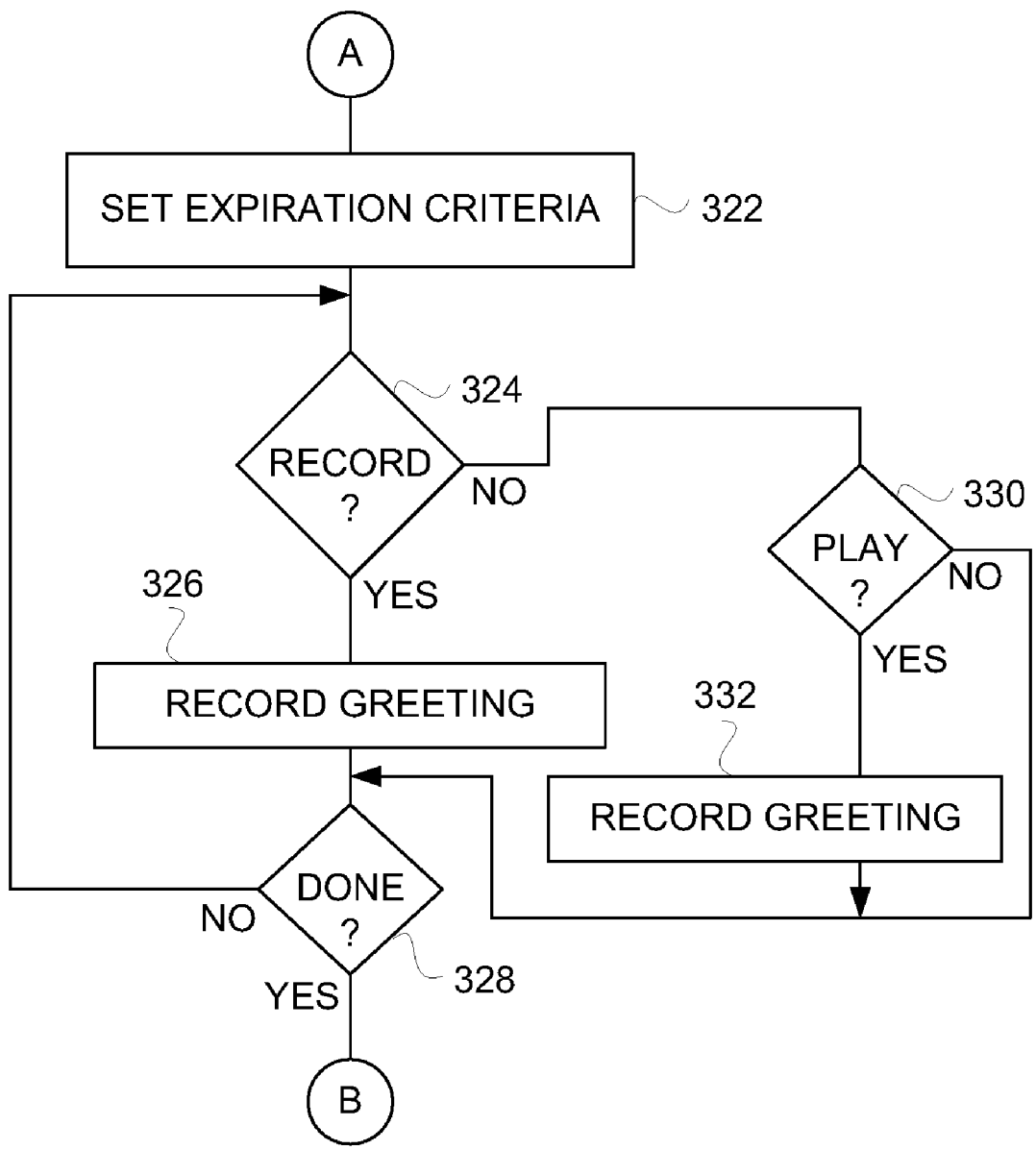

FIGS. 3A and 3B are flow diagrams of a contact greeting configuration process 300 according to one embodiment of the invention. The contact greeting configuration process 300 can, for example, be preformed on a mobile communication device, such as the mobile communication device 102 illustrated in FIG. 1. The contact greeting configuration process 300 allows a user of a mobile communication device to associate particular voicemail greetings to particular contacts.

The contact greeting configuration process 300 can display 302 a list of contacts. The contacts being displayed 302 are those contacts that are associated with the mobile communication device or its user. For example, the mobile communication device can store an address book that contains a plurality of contacts. After the list of contacts is displayed 302, a decision 304 can determine whether a contact has been selected from the list of contacts. When the decision 304 determines that a contact has not been selected, a decision 306 can determine whether another input has been received. When the decision 306 determines that another input has been received, other processing 308 can be performed depending upon the type of other input. Alternatively, when the decision 306 determines that no other input has been received, the contact greeting configuration process 310 can return to repeat the block 302 and subsequent blocks.

On the other hand, when the decision 304 determines that a contact has been selected from the list of contacts, contact information pertaining to the selected content can be displayed 310. A decision 312 can then determine whether a greeting change is requested for the selected contact. When the decision 312 determines that a greeting change is not requested, a decision 313 can determine whether the contact greeting configuration process 300 should end. When the decision 313 determines that the contact greeting configuration process should end, then the contact greeting configuration process 300 ends. Alternatively, when the decision 313 determines that the contact greeting configuration process 300 should not end, the contact greeting configuration process 310 returns to repeat the decision 312.

Once the decision 312 determines that a greeting change is requested, a list of available greetings can be displayed 314. The list of available greetings can be displayed 314 as a list of identifiers (e.g., names, images, or icons) for the available greetings. The list of identifiers can be obtained from the identification information for the available greetings. The mobile communication device can store the identification information for the available greetings.

Next, a decision 316 can determine whether a greeting has been selected from the list of available greetings. When the decision 316 determines that a selection has not been made, a decision 318 can determine whether a new greeting is to be created. When the decision 318 determines that a new greeting is not to be created, the contact greeting configuration process 300 can return to repeat the decision 316. When the decision 316 determines that a selection has been made, the selected greeting can be associated 320 with the selected contact. Following the block 320, the contact greeting configuration process 300 can end.

On the other hand, when the decision 318 determines that a new greeting is to be created, the contact greeting configuration process 300 can facilitate the creation of a new greeting using the mobile communication device. In particular, expiration criteria for the new greeting can be set 322. The expiration criteria can control when the new greeting is to expire. Expiration of a greeting can eliminate the greeting from being available for usage or can simply de-select in the greeting from being in use. After expiration criteria, if any, is set 322 for the new greeting, a decision 324 can determine whether a record request has been received. A record request is a request by the user of the mobile communication device to begin recording the new greeting being created. When the decision 324 determines that a record request has been received, the new greeting can be recorded 326. Here, the user of the mobile communication device can speak (or otherwise provide audio) for the new greeting that is to be recorded. The mobile communication device can include a microphone for which audio for the greeting (e.g., spoken greeting by the user) can be picked-up and recorded (and thus stored) at the mobile communication device. In doing so, the contact greeting configuration process 300, although not shown, can limit the duration permitted for the greeting. For example, greetings can be limited to thirty (30) seconds. After the greeting has been recorded 326, a decision 328 can determine whether the user is done creating the new greeting. When the decision 328 determines that the user is not done creating the new greeting, the contact greeting configuration process 300 can return to repeat the decision 324 and subsequent blocks.

Also, when the decision 324 determines that a record request has not been received, a decision 330 can determine whether a play request has been received. The play request allows the user of the mobile communication device to cause a previously created greeting (or other available greetings) to be played by the mobile communication device. Hence, when the decision 330 determines that a play request has been received, then the greeting being created can be played 332. On the other hand, when the decision 330 determines that a play request has not been received, the block 332 can be bypassed. Following the block 332, or its bypass, the decision 328 can be performed. When the decision 328 determines that creation of the new greeting is done, the contact greeting configuration process 300 can return to repeat the block 314 so that the list of available greetings being displayed can be updated and thereafter utilized as discussed above with regard to the contact greeting configuration process 300.

Figure 4:
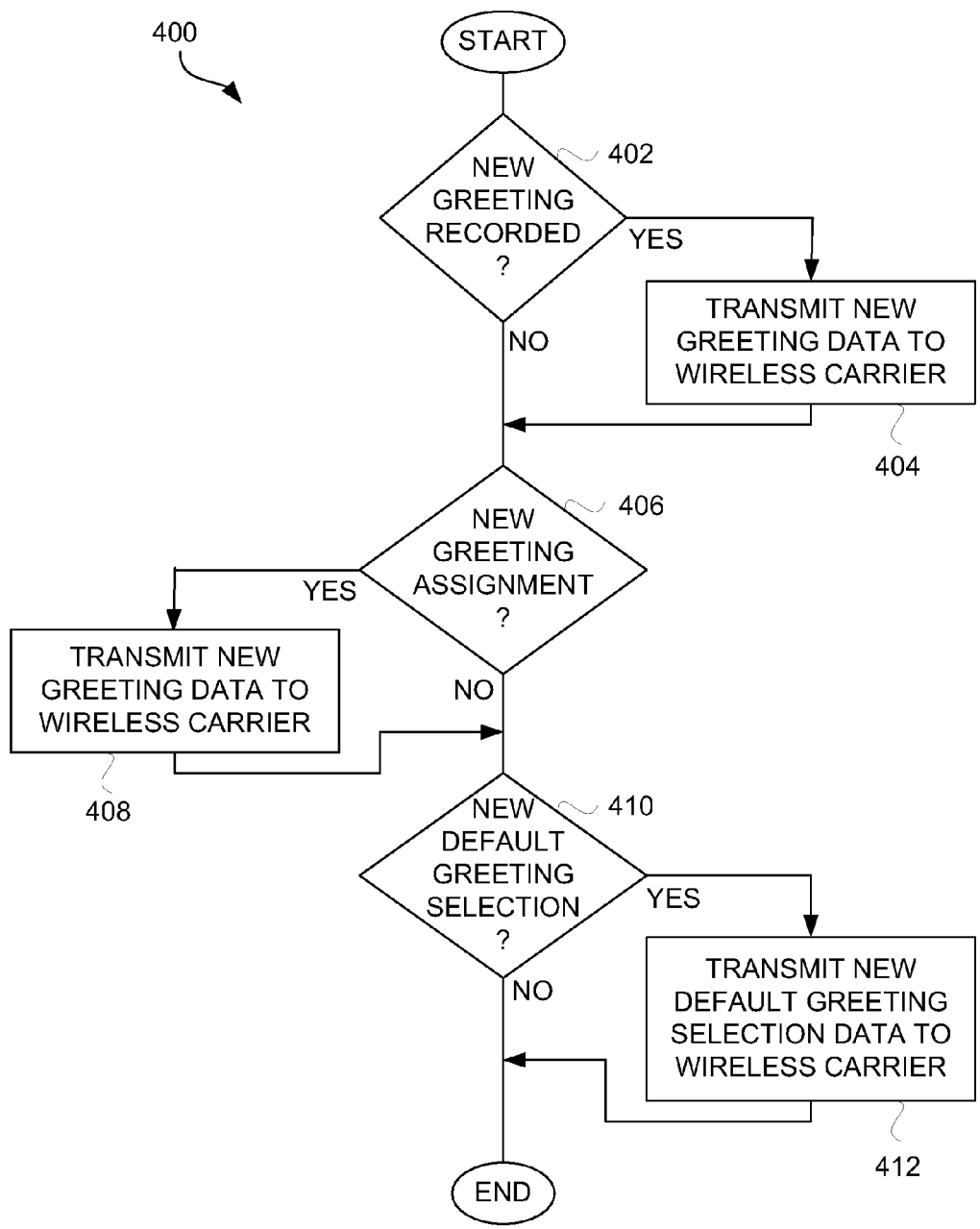
FIG. 4 is a flow diagram of a greeting update process according to one embodiment of the invention.

FIG. 4 is a flow diagram of a greeting update process 400 according to one embodiment of the invention. The greeting update process 400 is, for example, performed on a mobile communication device. The greeting update process 400 operates to provide greeting information to a wireless carrier (wireless service provider) that supports wireless connectivity made available to the mobile communication device.

The greeting update process 400 can begin with a decision 402 that determines whether a new greeting has been recorded. When the decision 402 determines that a new greeting has been recorded, new greeting data associated with the new greeting that has been recorded can be transmitted 404 to the wireless carrier.

Following the block 404, or directly following the decision 402 when a new greeting has not been recorded, a decision 406 can determine whether a new greeting assignment has been made. When the decision 406 determines that a new greeting assignment has been made, new greeting assignment data can be transmitted 408 from the mobile communication device to the wireless carrier.

Following the block 408, or directly following the decision 406 when a new greeting has not been assigned, a decision 410 can determine whether a new default greeting selection has been made. When the decision 410 determines that a new default greeting selection has been made, new default greeting selection data can be transmitted 412 to the wireless carrier. Following the block 412, or directly following the decision 410 when a new default greeting had not been selected, the greeting update process 400 can end. However, it should be recognized that the greeting update process 400 can periodically be performed or be performed any time there is a change in greeting configurations or data. For example, the greeting update process 400 can be activated following creation of a new greeting, following a change in greeting assignment, or following a change in default greeting selection.

Figure 5A:
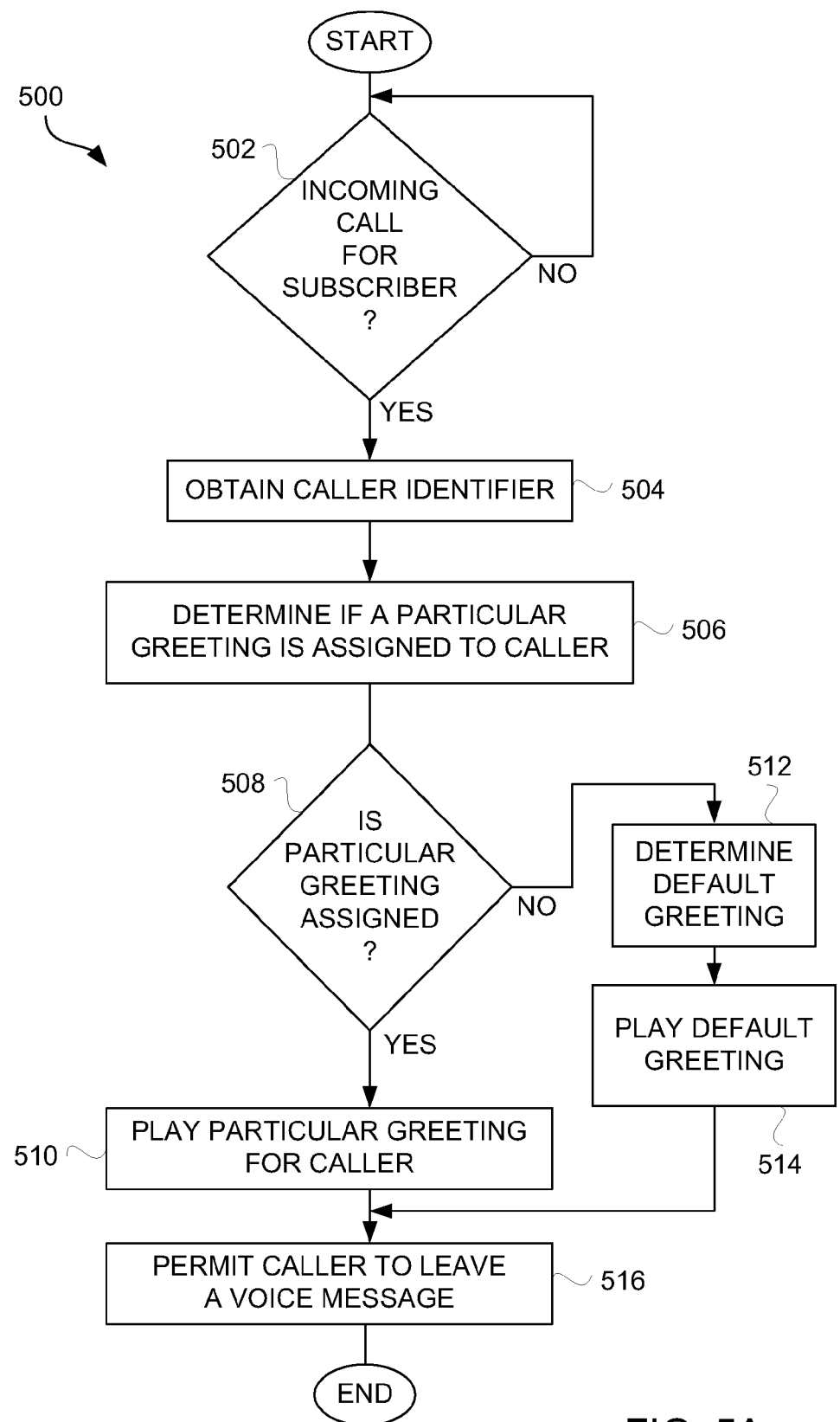
FIG. 5A is a flow diagram of a server voicemail process according to one embodiment of the invention.

FIG. 5A is a flow diagram of a server voicemail process 500 according to one embodiment of the invention. The server voicemail process 500 is, for example, performed by a voicemail system provided on a remote server device, such as the voicemail server 110 illustrated in FIG. 1.

The server voicemail process 500 can begin with a decision 502 that determines whether there is an incoming call for a subscriber. When the decision 502 determines that there is no incoming call, the server voicemail process 500 can await the receipt of an incoming call. Here, in the incoming call is an incoming call for a particular subscriber that is being directed to the particular subscriber's voicemail. Once the decision 502 determines that there is an incoming call for a particular subscriber, a caller identifier for the caller is obtained 504. For example, the caller identifier can be a phone number or a name associated with the caller. Next, the server voicemail process 500 determines 506 if a particular greeting has been assigned to the caller. Here, as discussed above, a user can interact with a mobile communication device to assign particular greetings to particular callers. Following the block 506, a decision 508 can determine whether a particular greeting has been assigned to the caller. When the decision 508 determines that a particular greeting has been assigned to the caller, the particular greeting can be played 510 for the caller. Namely, the particular greeting is a voicemail greeting that is played 510 to the caller since the incoming call by the caller has not been accepted or answered by the subscriber.

Alternatively, when the decision 508 determines that a particular greeting has not been assigned to the caller, a default greeting can be determined 512. After the default greeting has been determined 512, the default greeting can be played 514 to the caller. After the particular greeting has been played 510 for the caller or the default greeting has been played 514 for the caller, the caller is permitted 516 to leave a voice message for the subscriber. Following the block 516, the server voicemail process 500 can end. However, the server voicemail process 500 can be performed for each incoming call to a voicemail system.

Figure 5B:
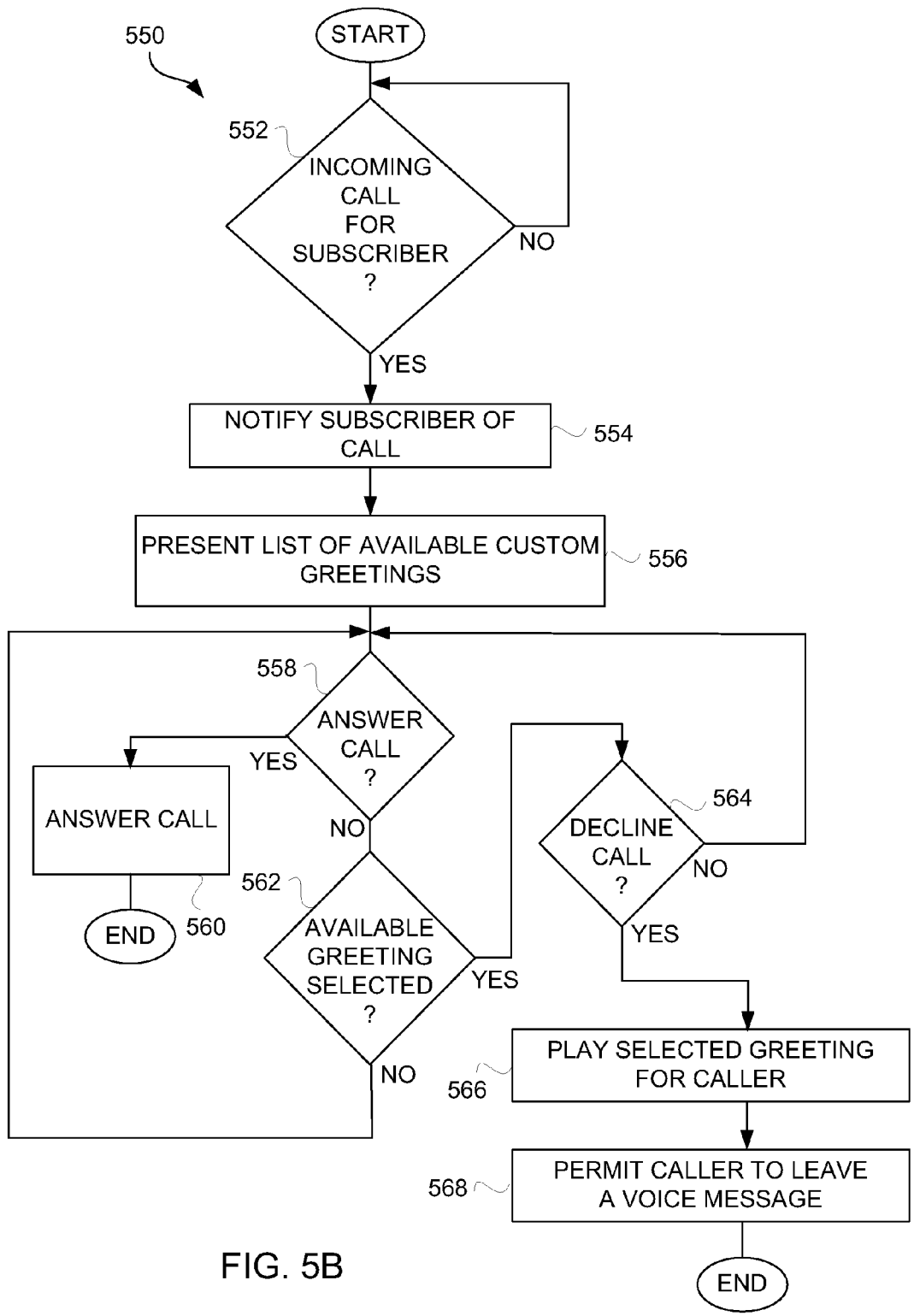
FIG. 5B is a flow diagram of a call handling process according to another embodiment of the invention.

FIG. 5B is a flow diagram of a call handling process 550 according to another embodiment of the invention. The call handling process 550 is, for example, at least partially performed by a call manager provided on a remote server device, such as the call manager 108 illustrated in FIG. 1, and/or (ii) an electronic device (e.g., mobile communication device) associated with a subscriber (user).

The call handling process 550 can begin with a decision 552 that determines whether there is an incoming call for a subscriber. When the decision 552 determines that there is no incoming call, the call handling process 550 can await the receipt of an incoming call. For example, the incoming call can be an incoming voice call for a particular subscriber. Once the decision 552 determines that there is an incoming call for a particular subscriber, the subscriber can be notified 554 of the call. For example, caller information (e.g., caller name, caller ID, etc.) can be presented for the subscriber. Typically, the subscriber is notified 554 of the call at an electronic device, such as a mobile communication device, associated with the subscriber. Next, a list of available custom greetings can be presented 556 (e.g., displayed), such as on or by the electronic device associated with the subscriber.

A decision 558 can then determine whether the call is to be answered. For example, the subscriber can interact with the electronic device associated with the subscriber to request that the incoming call be answered. When the decision 558 determines that the incoming call is to be answered, the incoming call is answered 560 and the subscriber can communicate with the caller. After the incoming call is answered, the call handling process 550 can end. On the other hand, when the decision 558 determines that the call is not (yet) to be answered, a decision 562 can determine whether one of the available custom greeting has been selected. For example, the subscriber can interact with the electronic device associated with the subscriber to select one of the available custom greetings being presented 556. If the decision 562 determines that none of the available custom greetings has been selected, then the call handling process 550 can return to repeat the decision 558.

Alternatively, when the decision 562 determines that one of the available custom greetings has been selected, a decision 564 can determine whether the incoming called is to be declined. When the decision 564 determines that the incoming call is not (yet) to be declined, the call handling process 550 can return to repeat the decision 558. On the other hand, when the decision 564 determines that the incoming call is to be declined, the selected available greeting can be played 566 to the caller. After the selected available greeting has been played 566 for the caller, the caller can be permitted 568 to leave a voice message for the subscriber. Following the block 568, the call handling process 550 can end. However, the call handling process 550 can be performed for each incoming call.

FIGS. 6A and 6B are exemplary greeting tables according to one embodiment of the invention. The exemplary greeting tables can be stored at a voicemail server (e.g., voicemail server 110) or a voicemail data (e.g., voicemail data 112) for use by a voicemail system in providing appropriate greeting to callers for a particular subscriber. Hence, the exemplary greeting tables are associated with a particular subscriber. However, since the voicemail system supports multiple subscribers, multiple exemplary greeting tables can be stored. As subscribers manage or create greetings, the exemplary greeting tables can be updated.

FIG. 6A is an exemplary greeting assignment table 600 according to one embodiment of the invention. The exemplary greeting assignment table 600 associates caller identifiers to one of the plurality of greetings available to a particular subscriber. In other words, when an incoming call for the particular subscriber is received from a caller, the caller identifier associated with the caller can be looked-up in the exemplary greeting assignment table 600 to identify the appropriate greeting to be provided to the caller.

FIG. 6B is an exemplary greeting location table 650 according to one embodiment of the invention. The exemplary greeting table 600 specifies file locations for the electronic files storing the audio data for the available greetings. For example, the file locations could be within the voicemail data 112 illustrated in FIG. 1. Once the appropriate greeting is identified by the exemplary greeting table 600, the corresponding electronic file storing the corresponding audio data can be identified using the exemplary greeting location table 650. The greeting location table 650 can also provide information on that particular one of the available greeting that is chosen as the default greeting. If a caller for the particular subscriber is not listed in the exemplary greeting location file 600, the default greeting is used.

FIGS. 7A-7L are exemplary screens that can be presented on a display according to one embodiment of the invention. The display can be associated with an electronic device, such as a mobile communication device. The exemplary screens are suitable for creating a new custom voicemail greeting.

Figure 7A:
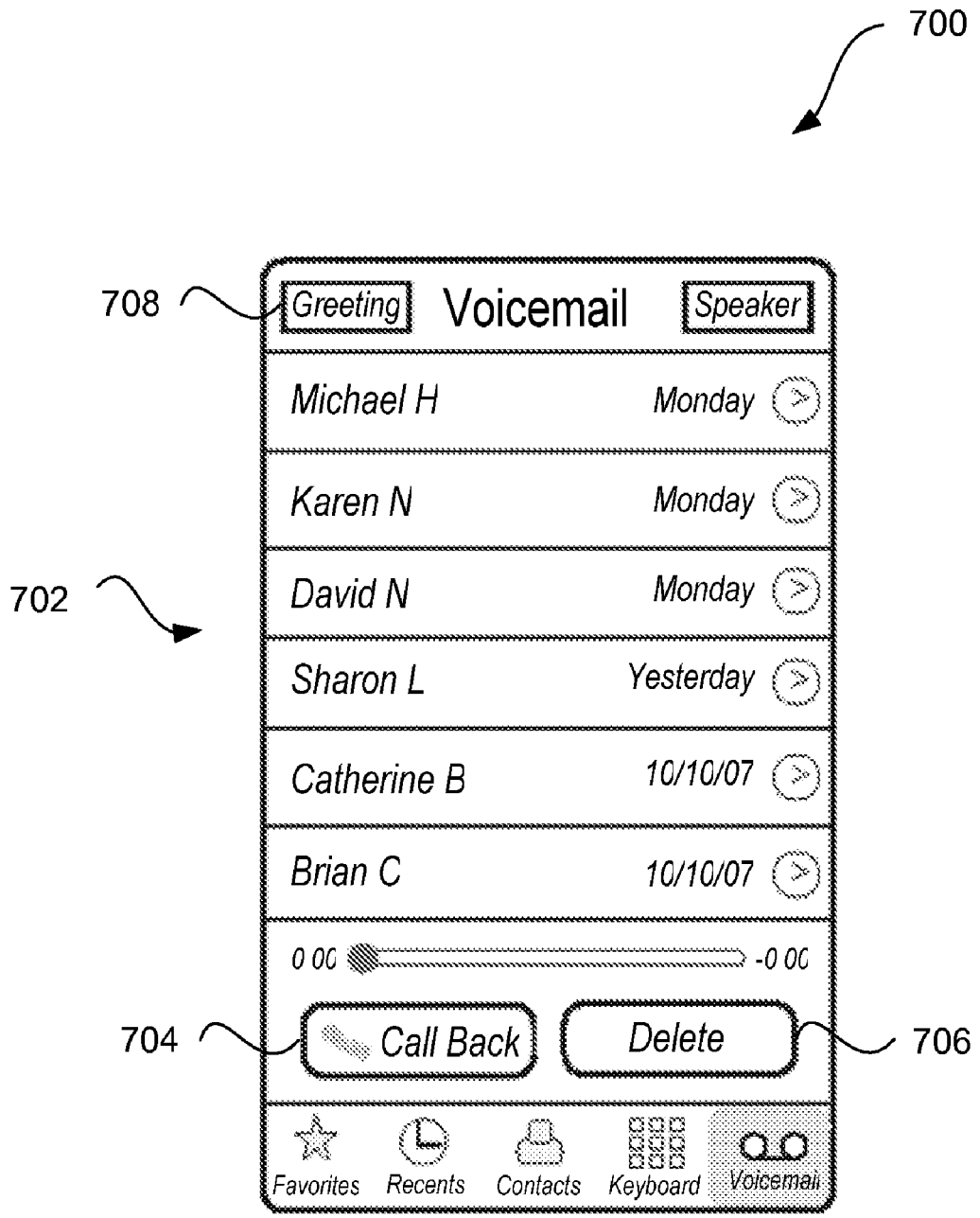
FIGS. 7A-7L are exemplary screens that can be presented on a display according to one embodiment of the invention.

FIG. 7A is an exemplary voicemail screen 700 according to one embodiment of the invention. The voicemail screen 700 displays a list 702 of voicemails that have been received for the user of the mobile communication device. The user can select one of the voicemails in the list 702 to cause the voicemail to be played. The voicemail screen 700 also provides a user control 704 to initiate a call back to any calling party that has left a voicemail, and a user control 706 to delete a voicemail. Further, the voicemail screening 700 includes a greeting control 708 that allows the user to configure, associate, arrange, record, or modify greetings to be provided to callers.

Figure 7B:
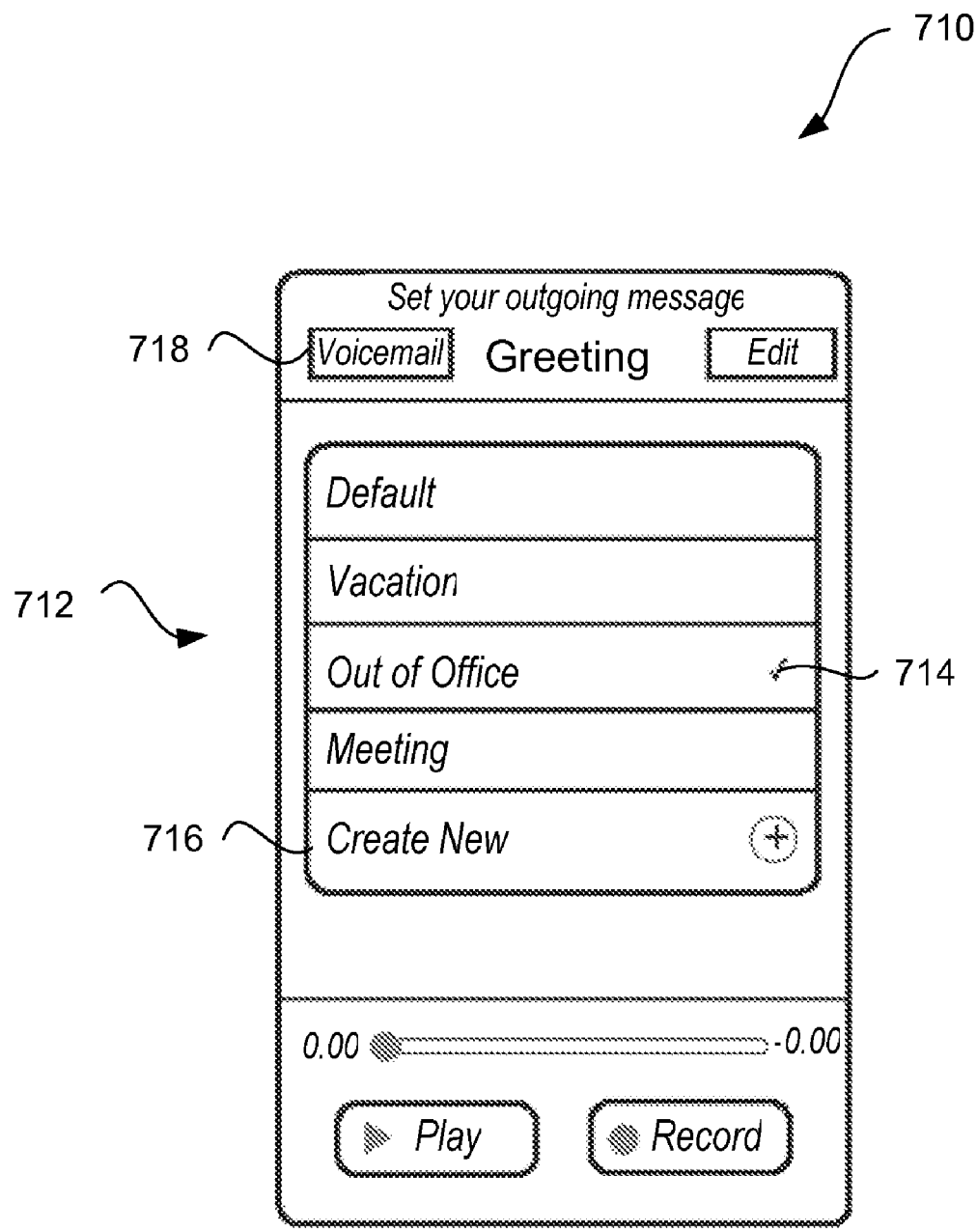

FIG. 7B is an exemplary greeting screen 710 according to one embodiment of the invention. The greeting screen 710 displays a list 712 of available greetings. A visual designator 714 indicates a particular one of the available greetings that is selected as a selected greeting (e.g., global default greeting). The list 712 illustrated in FIG. 7B includes available greetings labeled as follows: "Default", "Vacation", "Out of Office" or "Meeting". In addition, the greeting screen 710 can include a user control 716 to initiate creation of a new greeting. In the example illustrated in FIG. 7B, the user control 716 is provided as an entry in the list 712. However, in other embodiments, the user control 716 can be provided in the greeting screen 710 outside of the list 712.

Figure 7C:
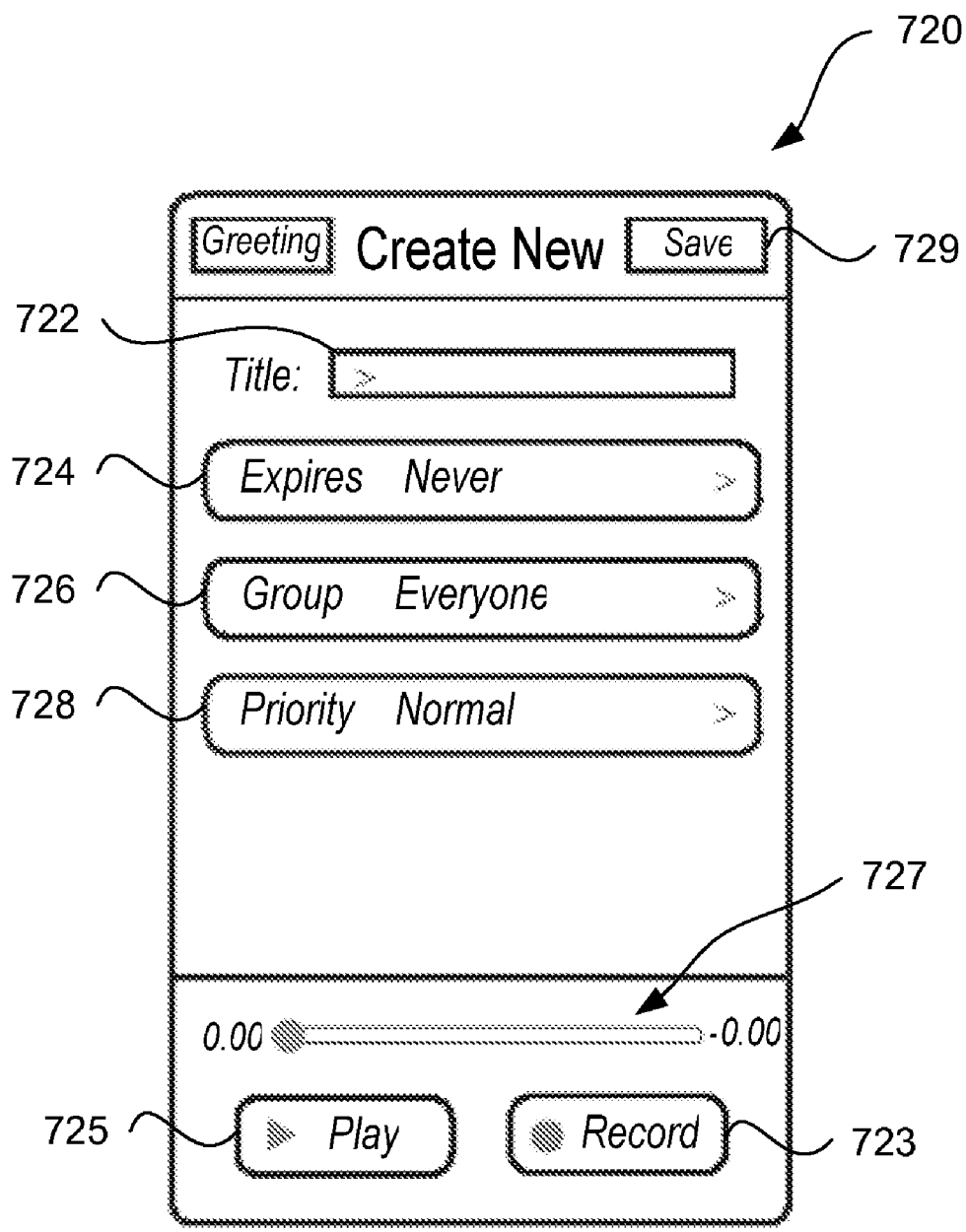

FIG. 7C is an exemplary greeting creation screen 720 according to one embodiment of the invention. The greeting creation screen 720 includes a title region 722 in which a title for the greeting can be entered. The greeting creation screen 720 also includes an expiration control 724 that allows a user to specify an expiration for the newly create greeting, if desired. Further, the greeting creation screen 720 can include a group control 726 that allows the user to specify one or more groups to be associated with the newly created greeting, if desired. Still further, the greeting creation screen 720 can include a priority control 728 that allows the user of the mobile communication device to set a priority for the newly create a greeting, if desired. The greeting creation screen 720 can also include a record user control 723 and a play user control 725. On selection of the record user control 723, the user can record an audio recording (e.g., greeting) to be used for the greeting being created. The selection of the play user control 725 can be selected to play back the audio recording (e.g., greeting) for the greeting. The greeting creation screen 720 can also include a playback control 727 that can allow a user to control playback position. The playback control 727 can also indicate a duration of the greeting. After the greeting creating screen 720 has been used to provided a title, expiration, grouping, priority and/or recording for the newly created greeting, a user control 729 can be activated to save the configuration for the newly create greeting.

Figure 7D:
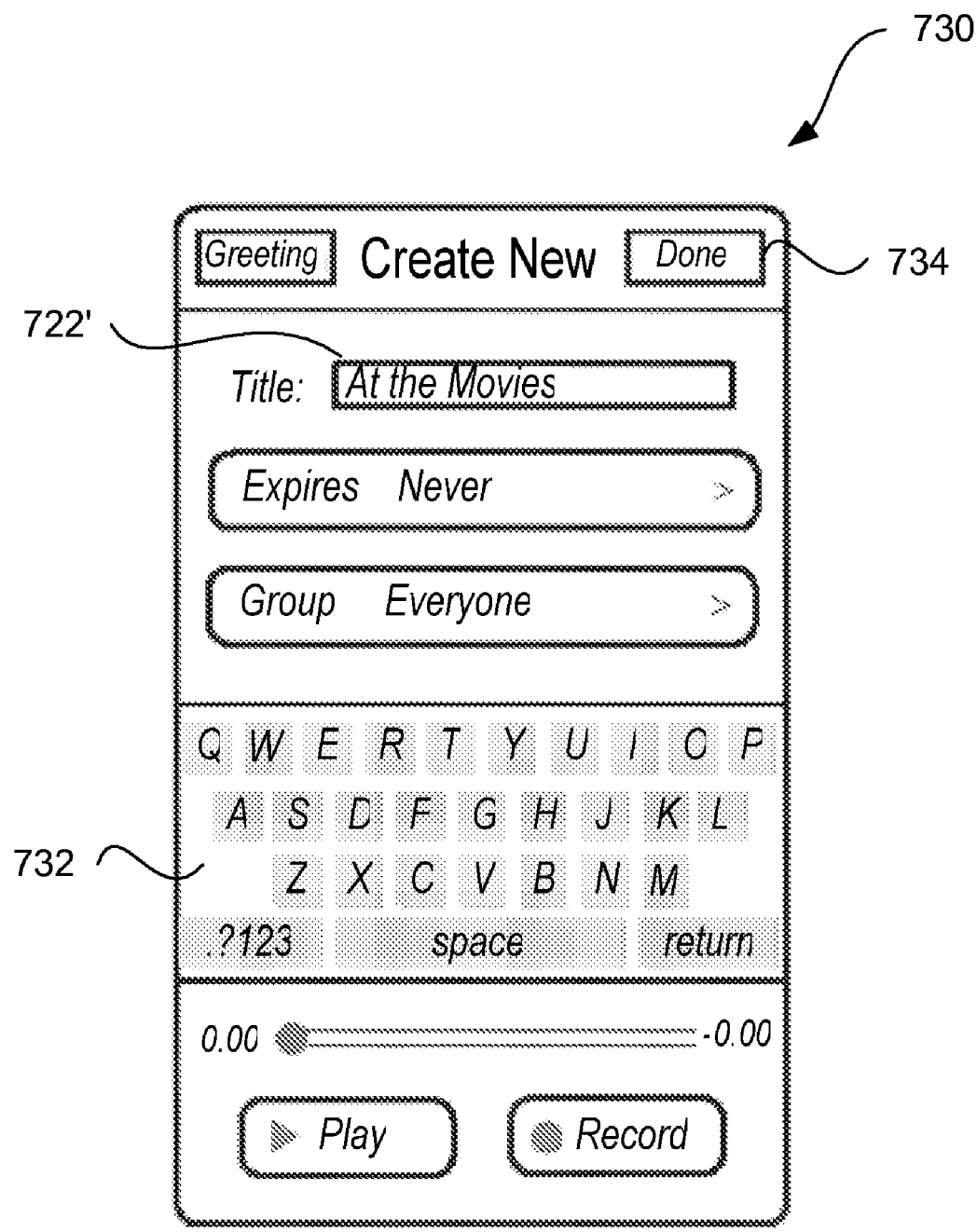

FIG. 7D is an exemplary text entry screen 730 according to one embodiment of the invention. When the user of the mobile communication device indicates that text entry is to be performed, the exemplary text entry screen 730 can be displayed. For example, the user can select the title region 722 to request entry of a title in the title region 722 of the greeting creation screen 720. Here, the user can interact with a virtual keyboard (e.g., QWERTY keyboard) to enter the title for the newly create greeting. Once the title has been entered, the title region 722' now contains the title. Thereafter, a user control 734 can be selected to end the text entry screen 730.

Figure 7E:
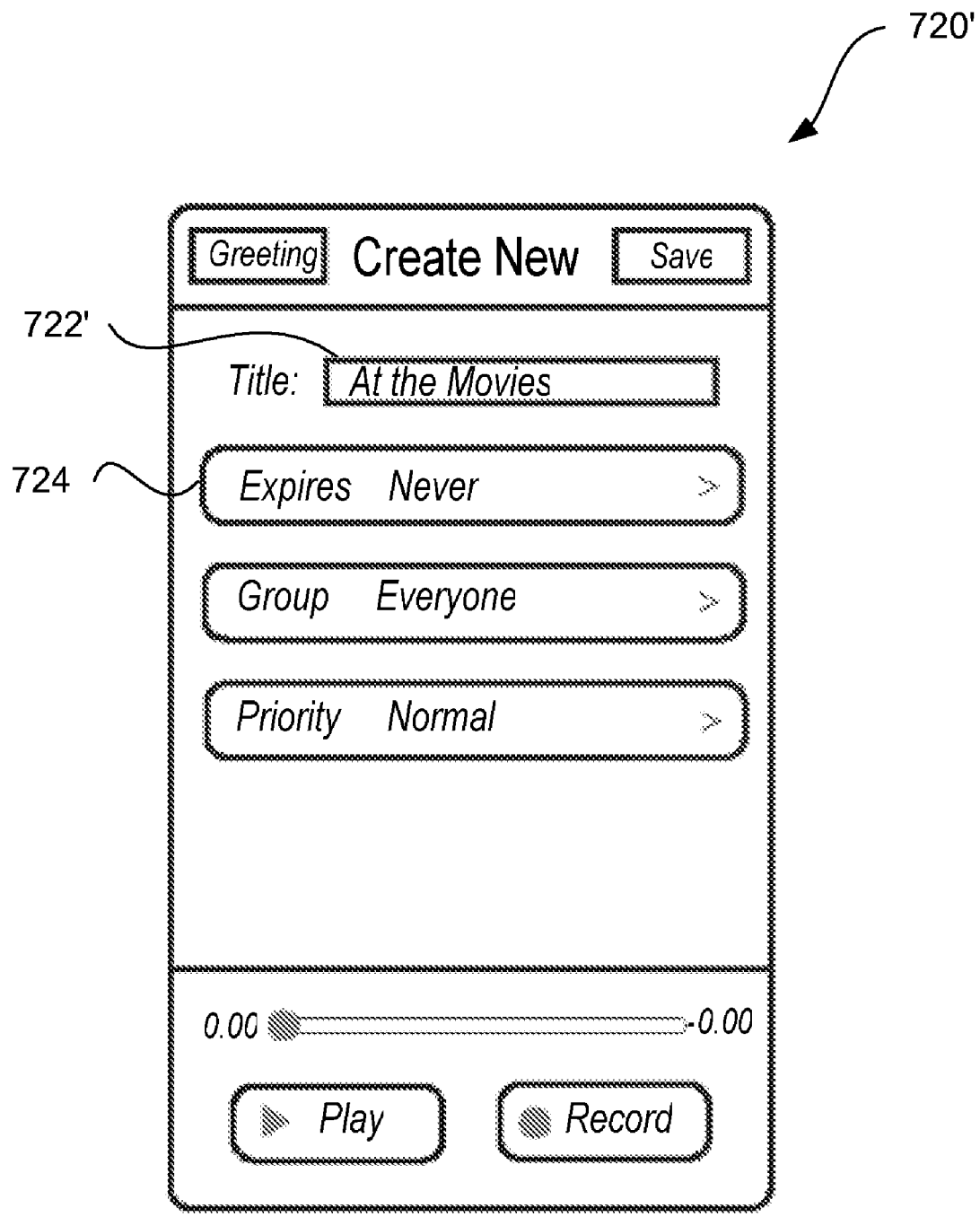

FIG. 7E is an exemplary greeting creation screen 720' according to one embodiment of the invention. The exemplary greeting creation screen 720' represents an updated version of the exemplary greeting creation screen 720 illustrated in FIG. 7C. The exemplary greeting creation screen 720' contains the title for the newly created greeting in the title region 722' as provided using the text entry screen 730.

Figure 7F:
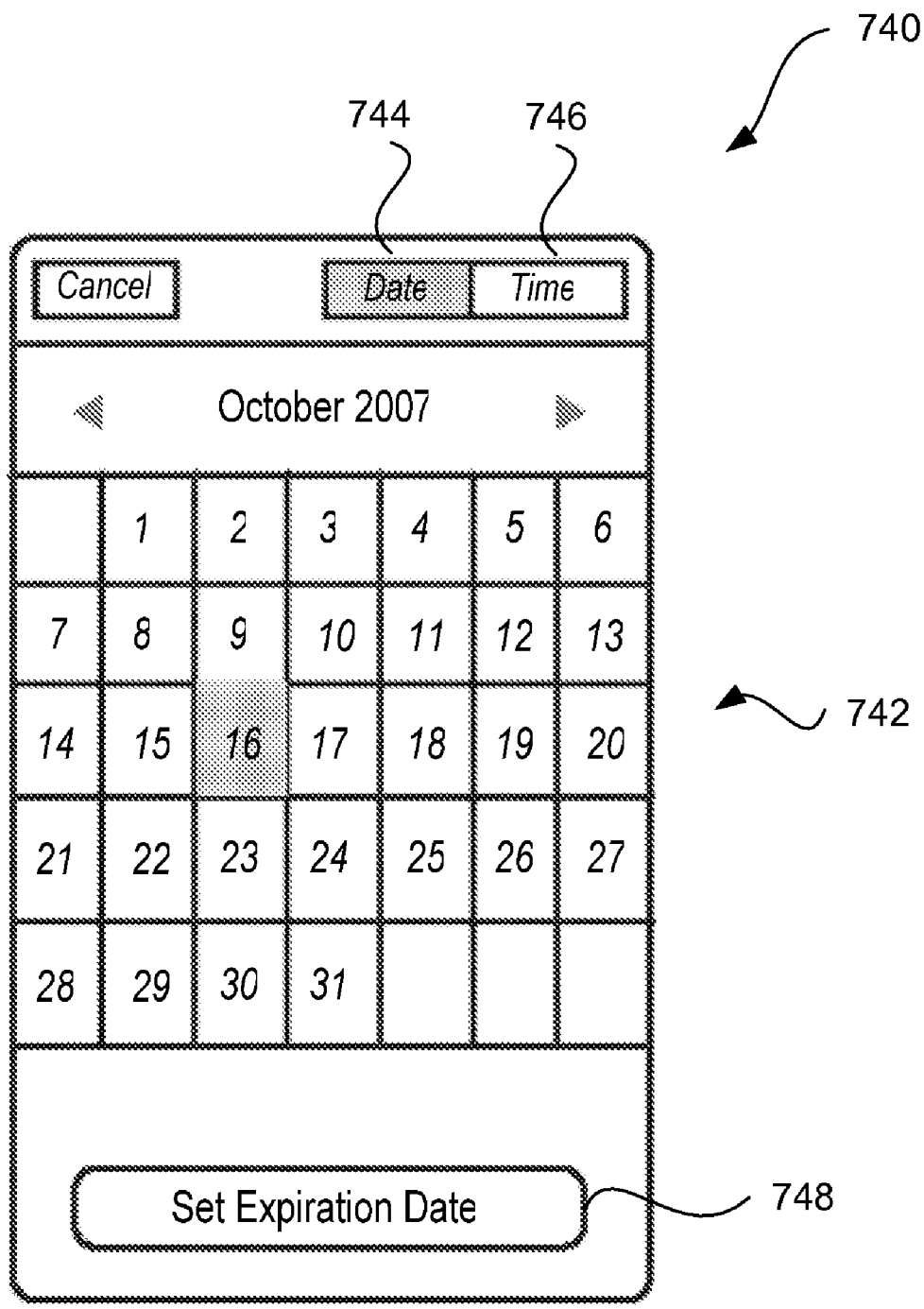

FIG. 7F is an exemplary diagram of an expiration screen 740 according to one embodiment of the invention. The expiration screen 740 assists the user in setting expiration data (e.g., expiration date and/or time) for the newly created greeting. The expiration screen 740 includes a date or time selection region 742. The user can interact with the date or time selection region 742 to select a date or time for expiration of the newly created reading. A user control 744, when selected, causes the date or time selection region 742 to display various dates for selection. A user control 746, when selected, causes the date or time selection region 742 to display various times for selection. Once the expiration date and/or time are entered, the expiration data can be stored by selection of a save control 748.

Figure 7G:
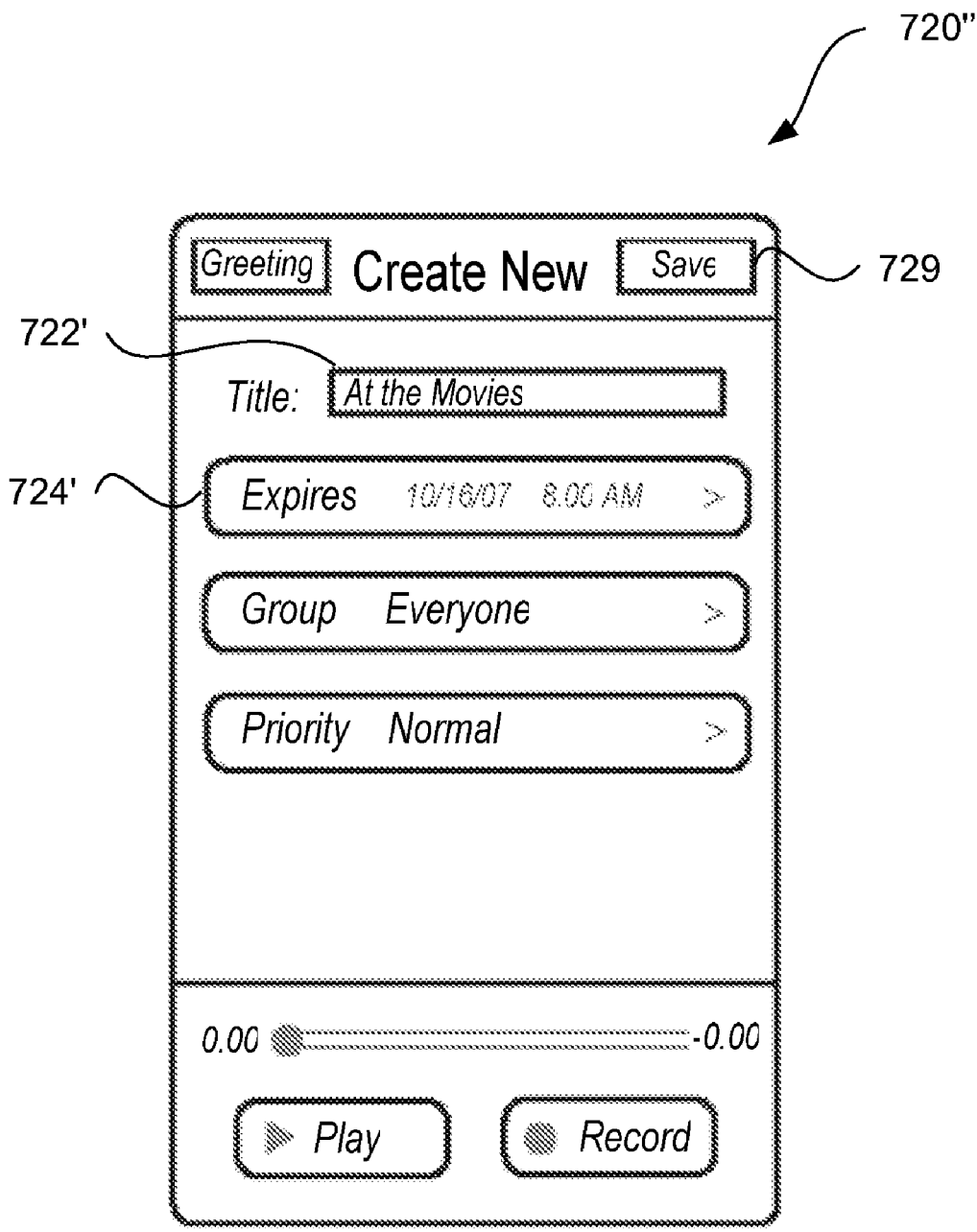

FIG. 7G is an exemplary greeting creation screen 720" according to one embodiment of the invention. The exemplary greeting creation screen 720" represents an updated version of the exemplary greeting creation screen 720' illustrated in FIG. 7E after entry of expiration data using the expiration screen 740 illustrated in FIG. 7F. Here, the exemplary greeting creation screen 720" now specifies a particular date and time for expiration in the expiration control 724'. In this embodiment, the expiration control 724' can visually specify the expiration date and/or expiration time for the newly create greeting.

Figure 7H:
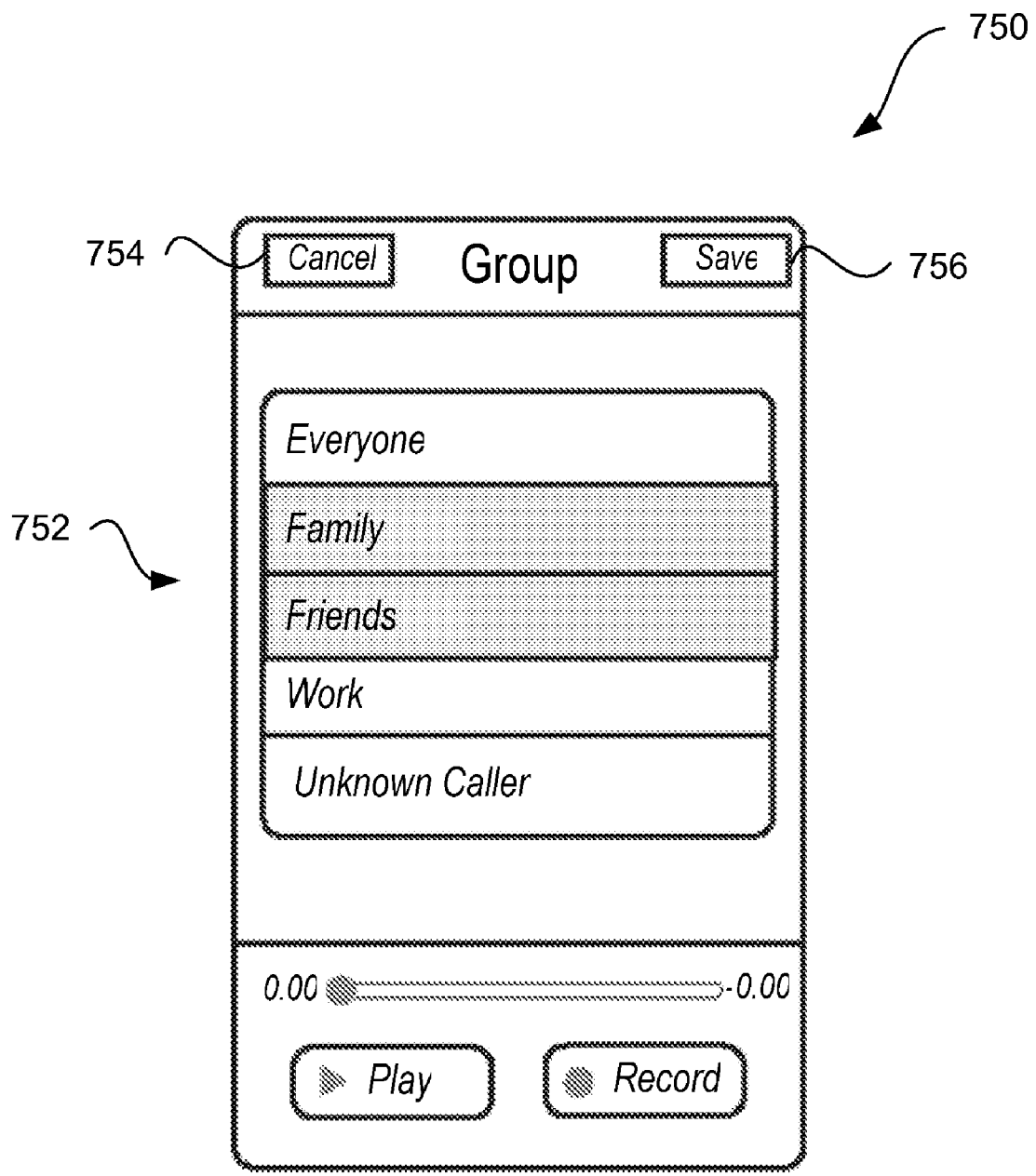

FIG. 7H is an exemplary group assignment screen 750 according to one embodiment of the invention. The exemplary group assignment screen 750 displays a list 752 of available groups that can be selected. Here, one or more of the listed groups can be selected and thereby associated with the newly create greeting. For example, the list 752 illustrated in FIG. 7H includes groups entitled: "Everyone", "Family", "Friends", "Work" and "Unknown Caller". The "Everyone" group can be pre-selected as the initial default. As shown in FIG. 7H, the user of the mobile communication device has selected the "Family" group as well as the "Friends" group. A cancel user control 754 can be selected to cancel the group assignment, and a save user control 756 can be selected to save the group assignment.

Figure 7I:
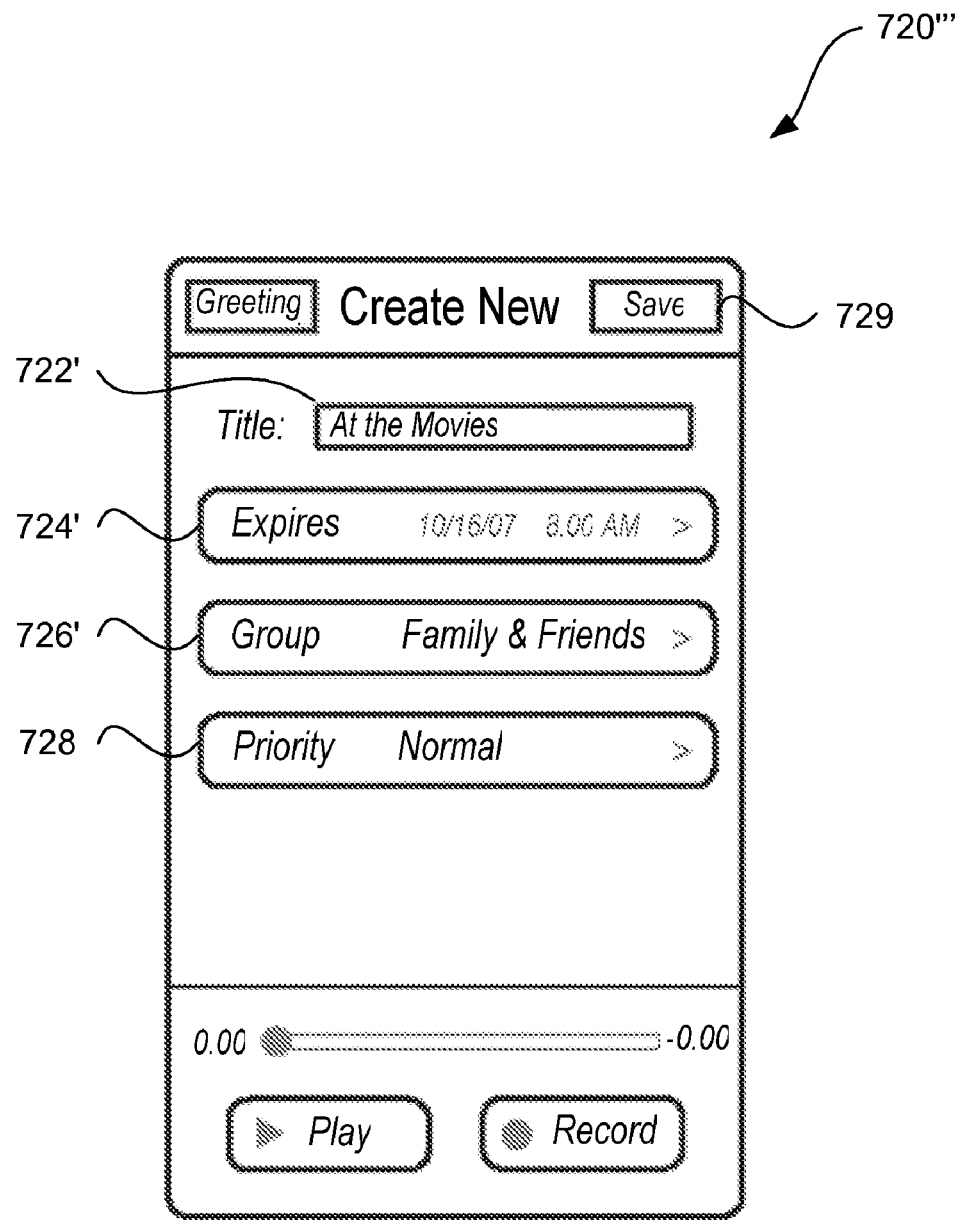

FIG. 7I is an exemplary greeting creation screen 720''' according to one embodiment of the invention. The exemplary greeting creation screen 720''' represents an updated version of the exemplary greeting creation screen 720" illustrated in FIG. 7G. The exemplary greeting creation screen 720''' now specifies one or groups that are associated to the greeting. In particular, the group control 726' specifies that the newly created greeting it is to be utilized for family & friends. The priority control 728 can specify an initial default priority as "normal" priority. However, the user can alter in the priority for the newly created greeting by selecting the priority control 728.

Figure 7J:
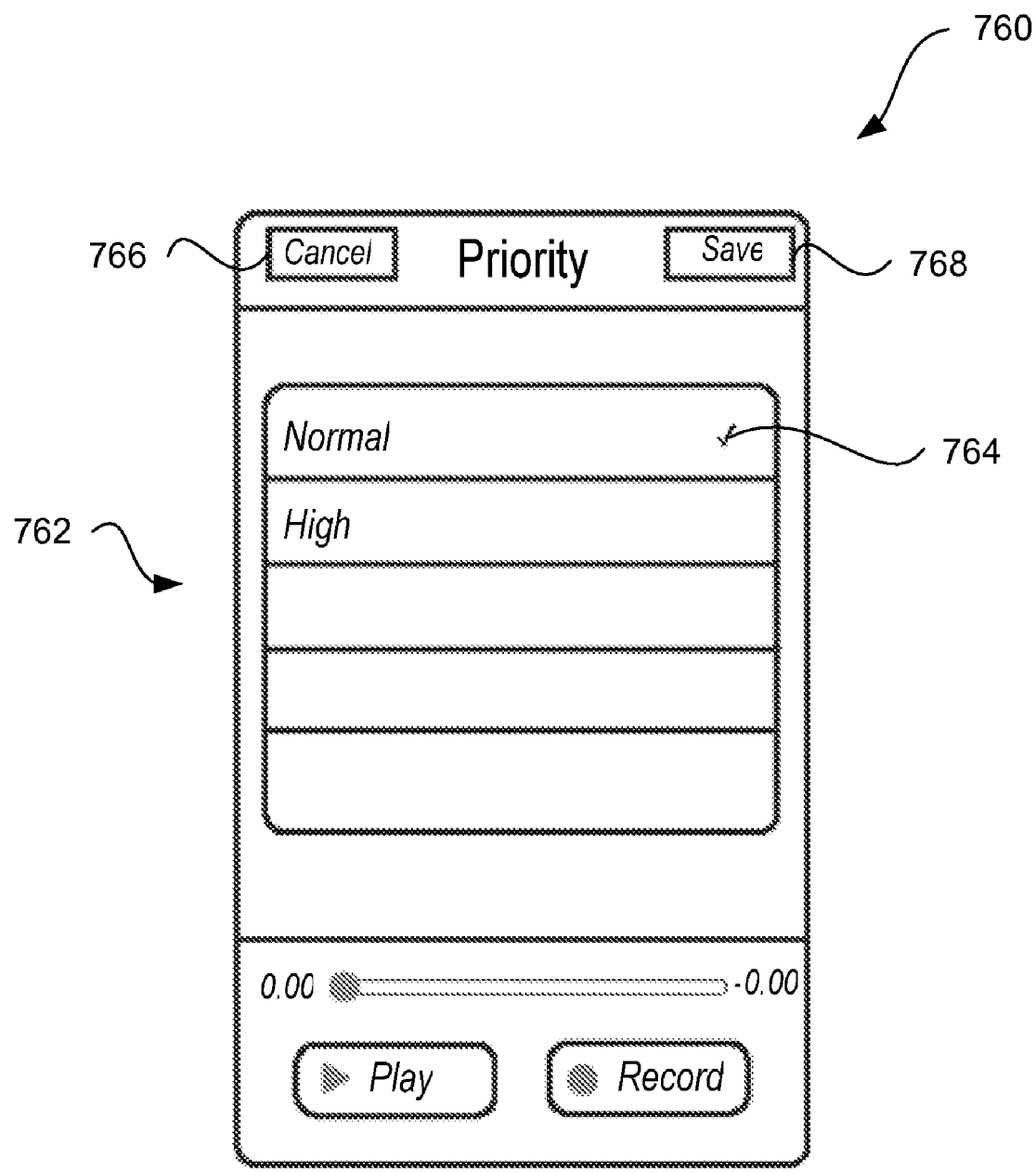

FIG. 7J is an exemplary priority assignment screen 760 according to one embodiment of the invention. The exemplary priority assignment screen 760 displays a list 762 of available priorities that can be selected. Here, one of the listed priorities can be selected and thereby associated with the newly created greeting. For example, the list 762 illustrated in FIG. 7J includes groups entitled: "Normal" and "High". As shown in FIG. 7J, a visual designator 764 can visually indicate the selected priority for the newly created reading. A cancel user control 766 can be selected to cancel the priority selected, and a save user control 768 can be selected to save the priority selection.

When the newly created greeting is set to normal priority, the hierarchy of greeting playback according to one embodiment can be as follows. If there is any customized greeting specified for the caller, such customized greeting is utilized as the voicemail greeting. If there is no customized greeting specified for the caller, the greeting to be utilized for the caller is a greeting assigned to a group, where the caller is part of the group. Still further, if there is no customized individual greeting and no customized group greeting for the caller, the greeting to be utilized for the caller is a globally assigned greeting. However, according to one embodiment, if the priority for a newly created greeting is high, such customized greeting can override any other greetings.

Figure 7K:
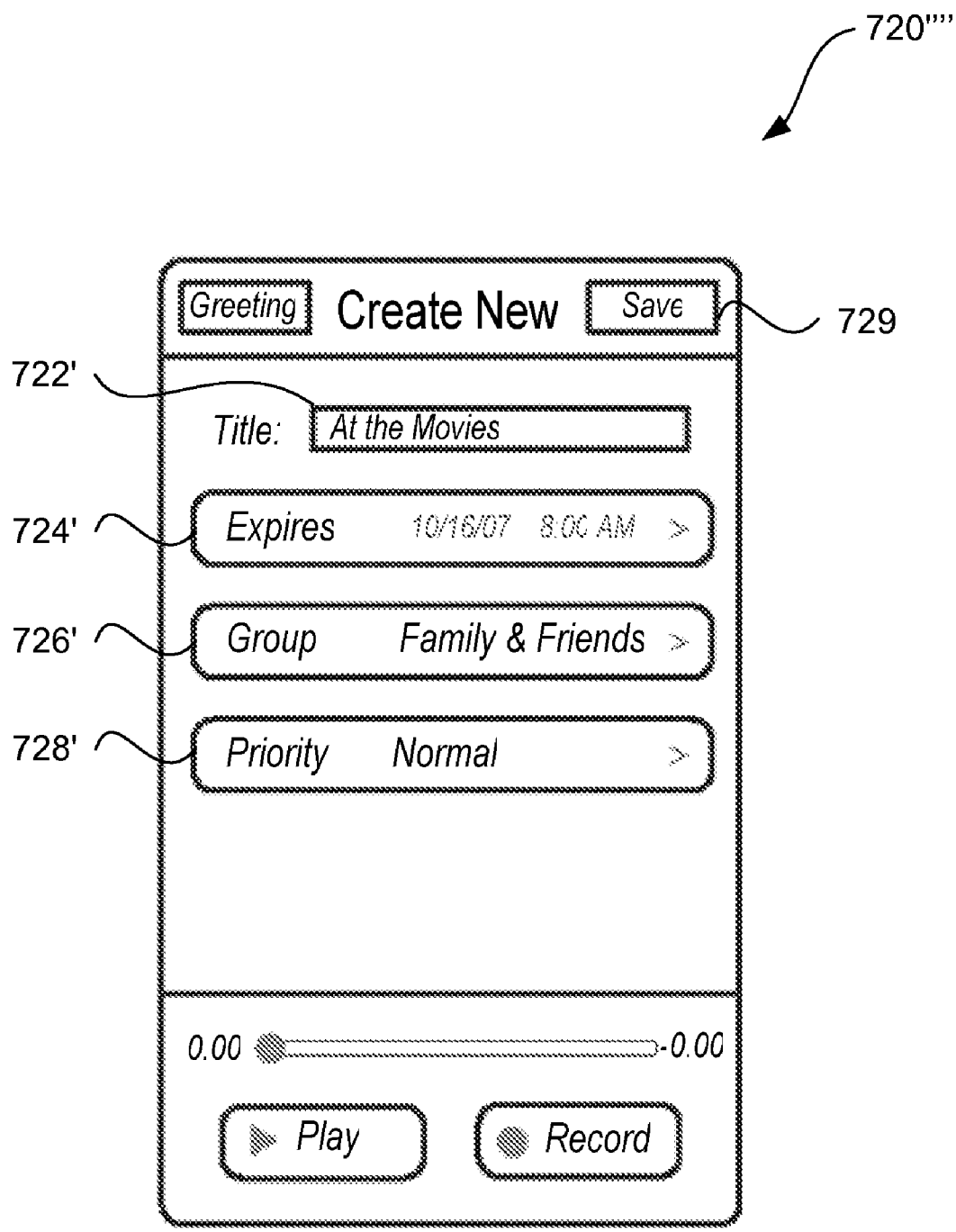
Figure 7L:
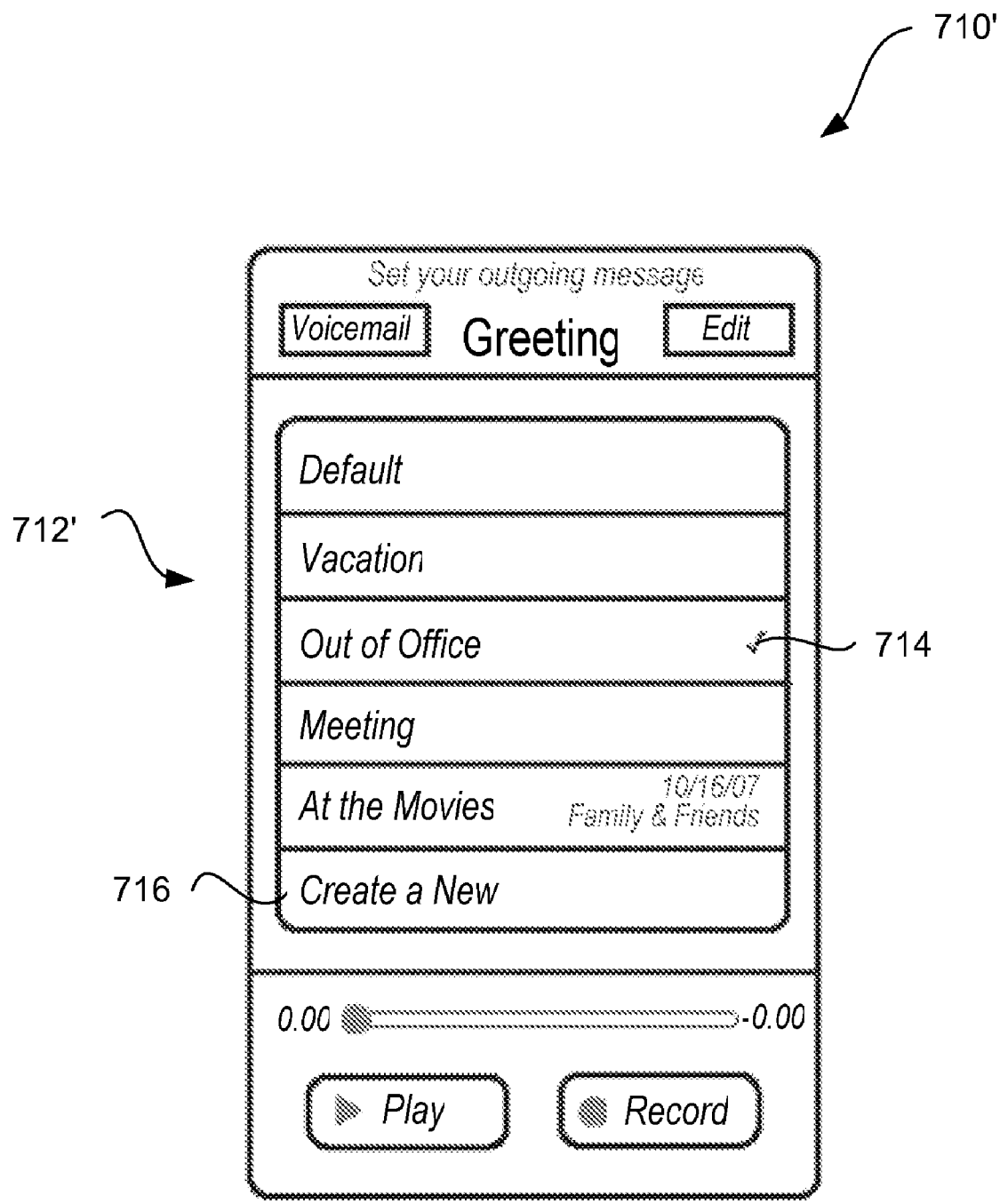

FIG. 7K is an exemplary greeting creation screen 720'''' according to one embodiment of the invention. The exemplary greeting creation screen 720'''' represents an updated version of the exemplary greeting creation screen 720''' illustrated in FIG. 7I. The exemplary greeting creation screen 720'''' specifies a priority for the newly created greeting in the priority control 728'. In particular, the priority control 728' specifies that the newly created greeting as normal priority, which was the initial default priority illustrated by the priority control 728 illustrated in FIG. 7I. The newly created greeting can be saved using the user control 729.

FIG. 7I is an exemplary greeting screen 710' according to one embodiment of the invention. The exemplary greeting screen 710' can follow from the greeting creation screens once the newly created greeting is saved using the user control 729 or the user navigates back to the exemplary greeting screen 710'. The exemplary greeting screen 710' represents an updated version of the exemplary greeting screen 710 illustrated in FIG. 7B. The list 712' of available greetings now includes the newly created greeting entitled "At the Movies", which expires on Oct. 16, 2007 and is affiliated with the "Family" and "Friends" groups. Hence, while the "Out of Office" available greetings is set as the global default as indicated by the visual indicator 714, if friends or family call, they will instead hear the custom greeting entitled "At the Movies" if they call before such custom greeting expires.

FIGS. 8A-8E are exemplary screens that can be presented on a display according to another embodiment of the invention. The display can be associated with an electronic device, such as a mobile communication device. The exemplary screens are suitable for assigning a custom voicemail to a particular contact.

Figure 8A:
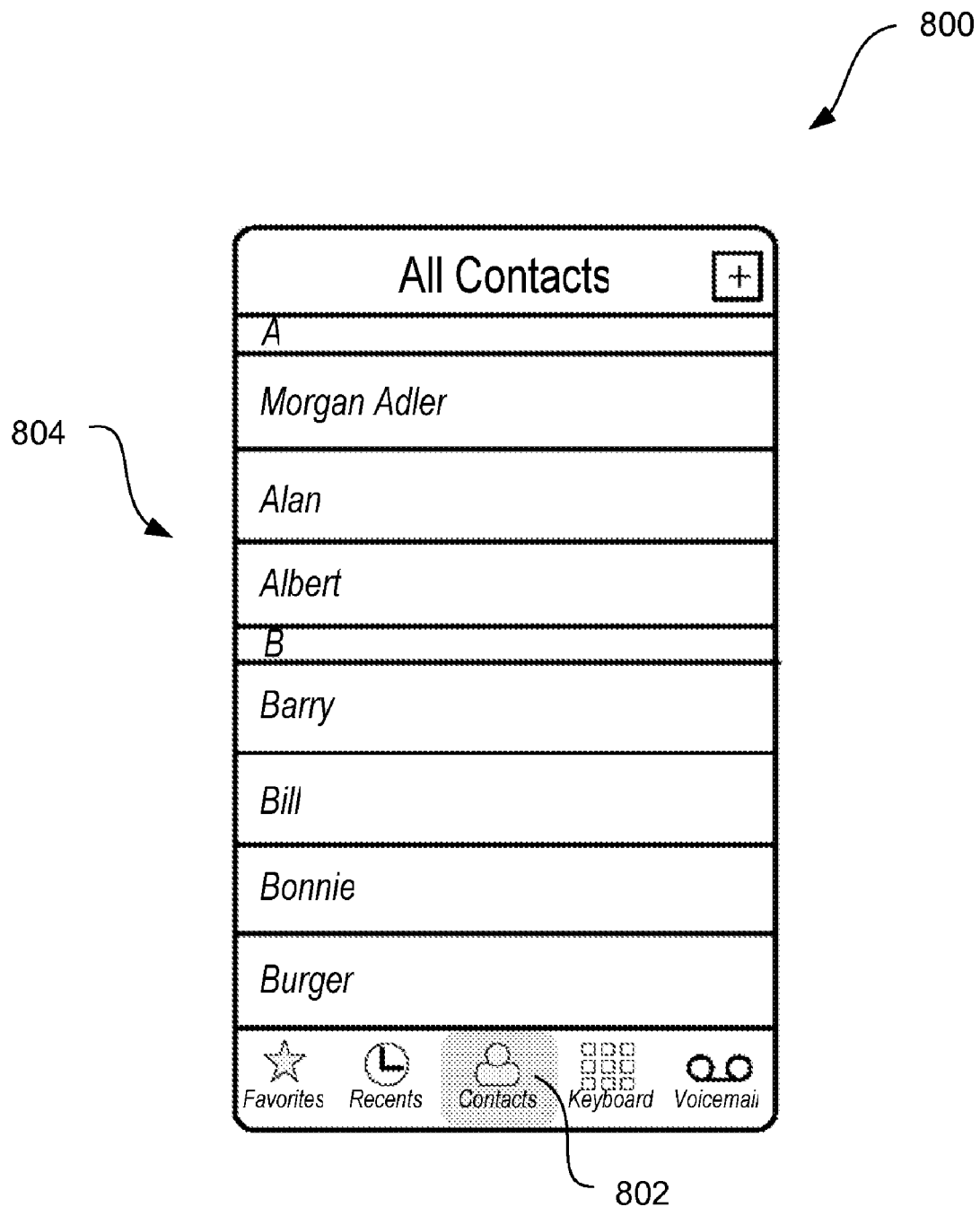
FIGS. 8A-8E are exemplary screens that can be presented on a display according to another embodiment of the invention.

FIG. 8A is an exemplary contacts screen 800 according to one embodiment of the invention. A "contacts" icon 802 is visually designated (e.g., highlighted) to indicated that a contact mode is active. When in the contact mode, a list 804 of contacts is displayed by the contacts screen 800. When a particular contact is selected from the list 804, contact information can be displayed for the selected contact.

Figure 8B:
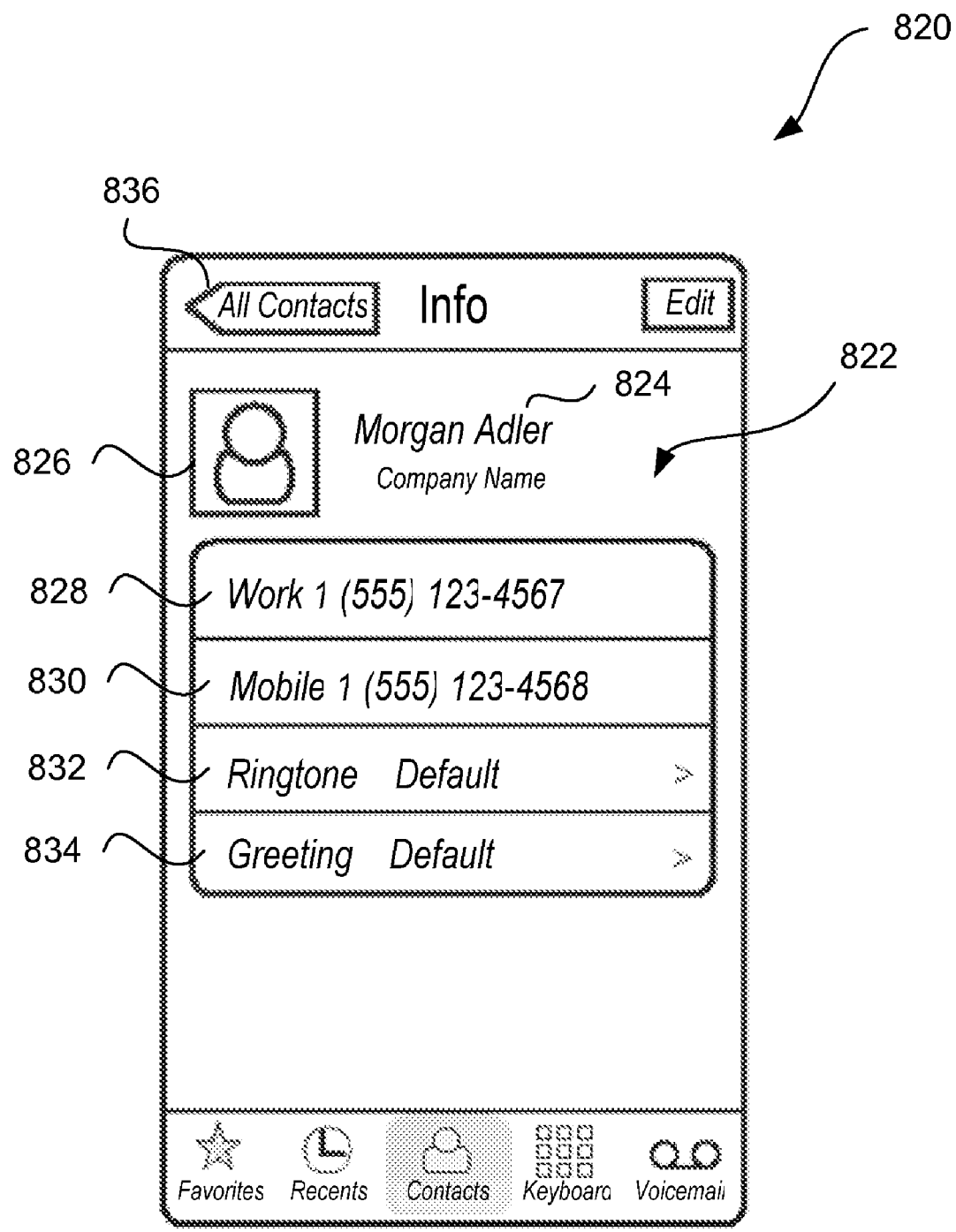

FIG. 8B is an exemplary contact information screen 820 according to one embodiment of the invention. The content information screen 820 displays content information 822. The contact information 822 includes a contact name 824, a content picture 826, a work phone number 828, a mobile phone number 830, a ringtone selection 832, and a greeting selection 834. As shown in FIG. 8B, the ringtone selection 832 specifies that a default ringtone is currently selected. The greeting selection 834 specifies that a default greeting is currently selected. The contact information screen 820 can also includes a user control 836 to navigate back to the contacts screen 800 illustrated in FIG. 8A.

Figure 8C:
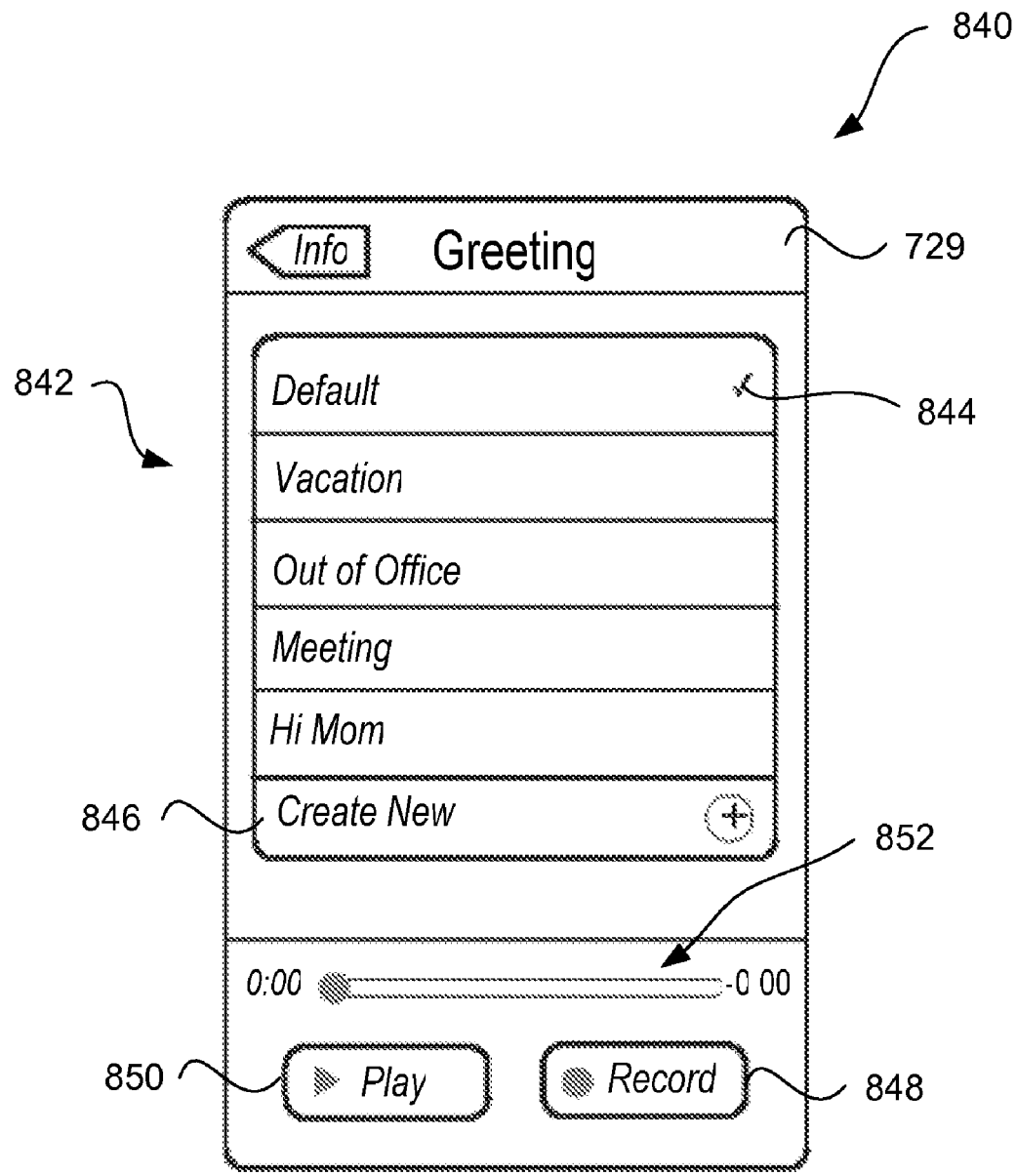

FIG. 8C is an exemplary greeting screen 840 according to one embodiment of the invention. The greeting screen 840 displays a list 842 of available greetings. A visual designator 844 indicates a particular one of the available greetings that is selected as a selected greeting (e.g., global default greeting). The list 842 illustrated in FIG. 8C includes available greetings labeled as follows: "Default", "Vacation", "Out of Office", "Meeting" or "Hi Mom". In addition, the greeting screen 840 can include a user control 846 to initiate creation of a new greeting. In the example illustrated in FIG. 8C, the user control 846 is provided as an entry in the list 842. However, in other embodiments, the user control 846 can be provided in the greeting screen 840 outside of the list 842. The greeting screen 840 can also include a record user control 848 and a play user control 850. On selection of the record user control 848, the user can record an audio recording (e.g., greeting) to be used for a greeting being created. The selection of the play user control 850 can be selected to play back the audio recording (e.g., greeting) for a selected one of the greetings. The greeting screen 840 can also include a playback control 852 that can allow a user to control playback position. The playback control 852 can also indicate a duration of the greeting.

If the user control 846 is selected, a new greeting is created. Creation of a new greeting for the selected contact creates a custom greeting for use for that contact only. In one embodiment, the created custom greeting for the selected contact is not made generally available as a default greeting.

Figure 8D:
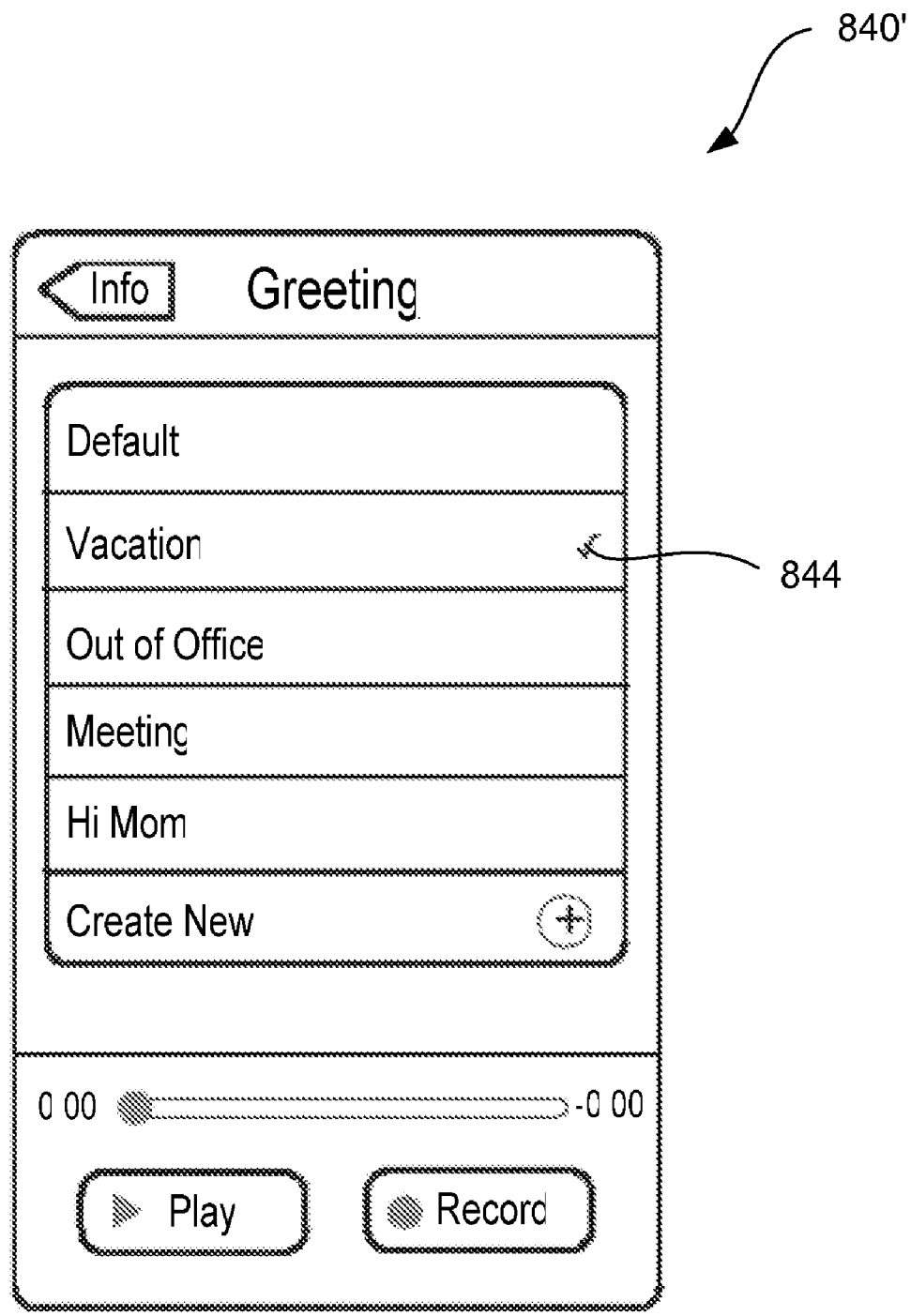

FIG. 8D is an exemplary greeting screen 840' according to one embodiment of the invention. The greeting screen 840' represents an updated version of the greeting screen 840 where the visual designator 844 selects the "Vacation" as a selected greeting (e.g., global default greeting) for the selected contact.

Figure 8E:
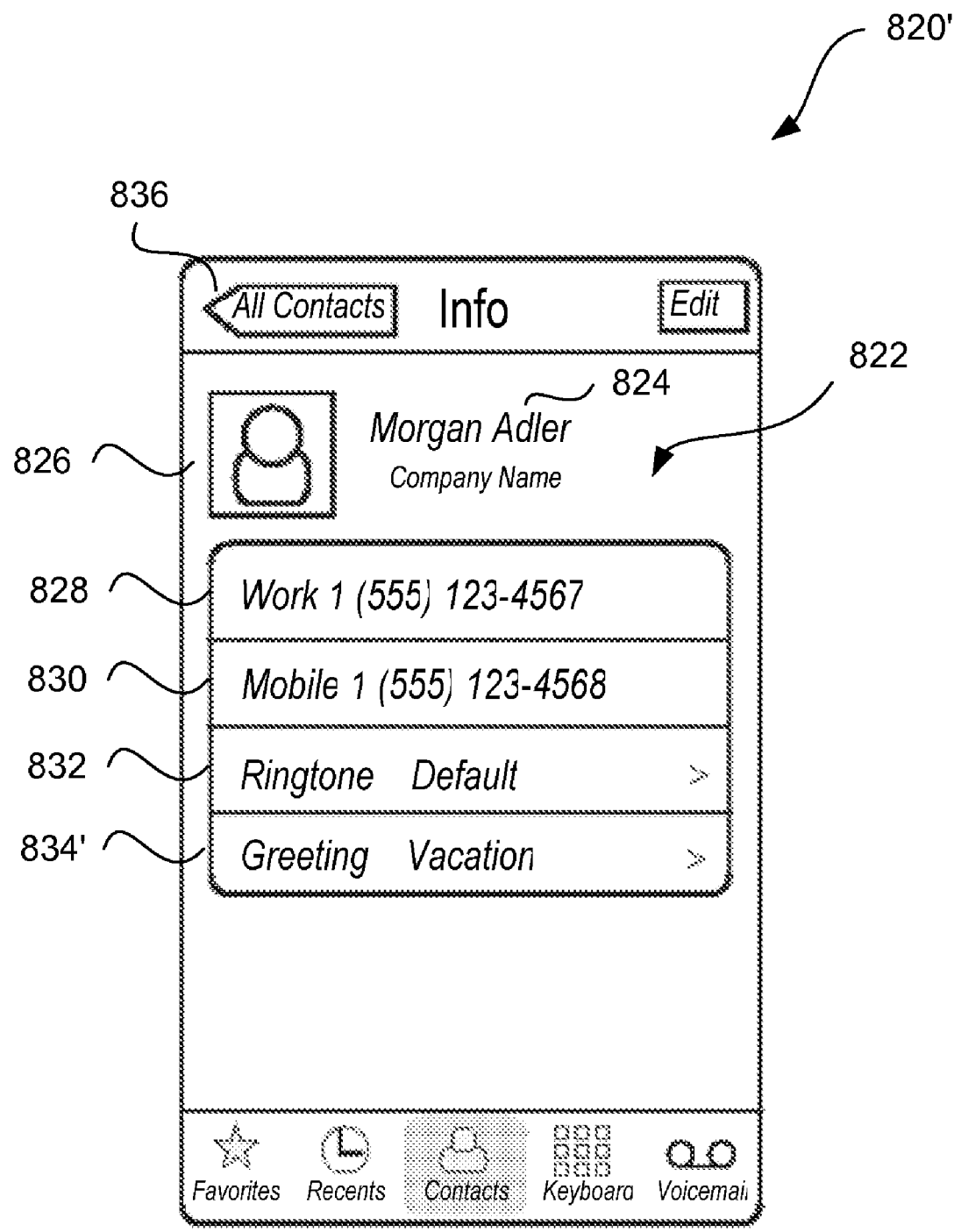

FIG. 8E is an exemplary contacts screen 820' according to one embodiment of the invention. The contacts screen 820' represents an updated version of the contacts screen 820 where the greeting selection 834' specifies that the selected greeting for the selected contact is the "Vacation" greeting.

Figure 9:
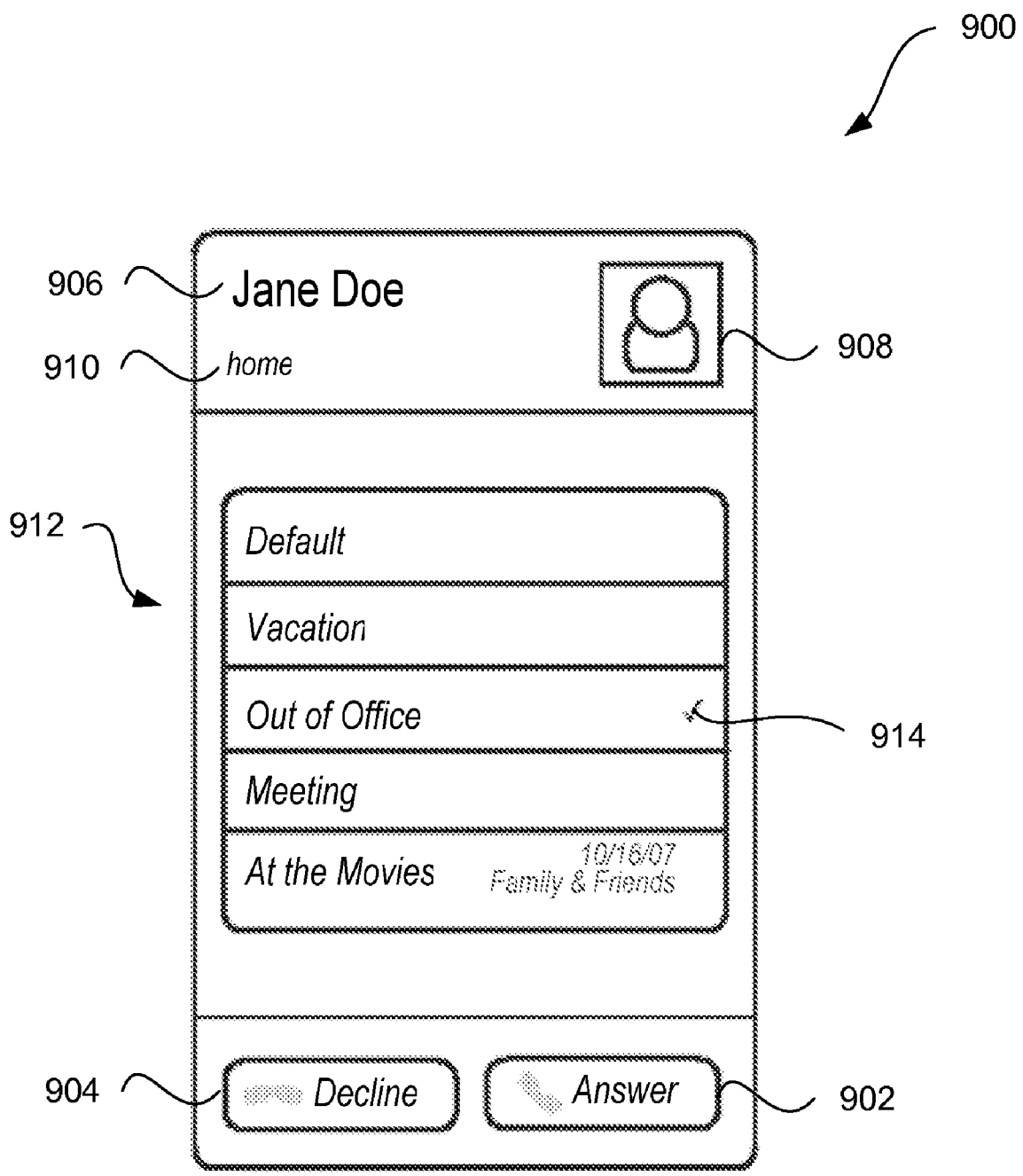
FIG. 9 is an exemplary incoming call screen according to one embodiment of the invention.

FIG. 9 is an exemplary incoming call screen 900 according to one embodiment of the invention. The exemplary incoming call screen 900 can be presented on a display of a mobile communication device when a call is incoming. The exemplary incoming call screen 900 can display an answer control 902 and a decline control 904. If the user selects the answer control 902, the incoming call can be answered and taken by the user of the mobile communication device. Alternatively, if the user selects the decline control 904, the incoming call can be declined in sent to voicemail where an appropriate greeting is presented to the caller.

The incoming call screen 900 can also display information concerning the caller, such as a name 906, a picture 908 and a calling location 910 associated with the caller. Further, the incoming call screen 900 can display a list 912 of available greetings. In one embodiment, a visual designator 914 can specify a selected one of the available greetings to be utilized if the incoming call is declined by the user. This is the available greeting that has been previously determined to be used for the incoming call. However, when the incoming call is initially received, the incoming call screen 900 is displayed to advise the user of the incoming call and the caller information. By also displaying the list 912 of the available greetings, the user is provided with the opportunity to dynamically select one of the available greetings prior to directing the incoming call to voicemail. Hence, if the current default greeting (e.g., "Out of Office") is not the most appropriate greeting for the incoming caller, the user can interact with the list 912 to select a more appropriate greeting (e.g., "Meeting") prior to directing the incoming call to voicemail. Hence, in one embodiment, the user is able to assign an appropriate one of the available greetings in real-time.

FIGS. 10A-10D are exemplary screens that can be presented on a display according to still another embodiment of the invention. The display can be associated with an electronic device, such as a mobile communication device. The exemplary screens are suitable for arranging for a custom audio message (e.g., custom voice message) to be sent.

Figure 10A:
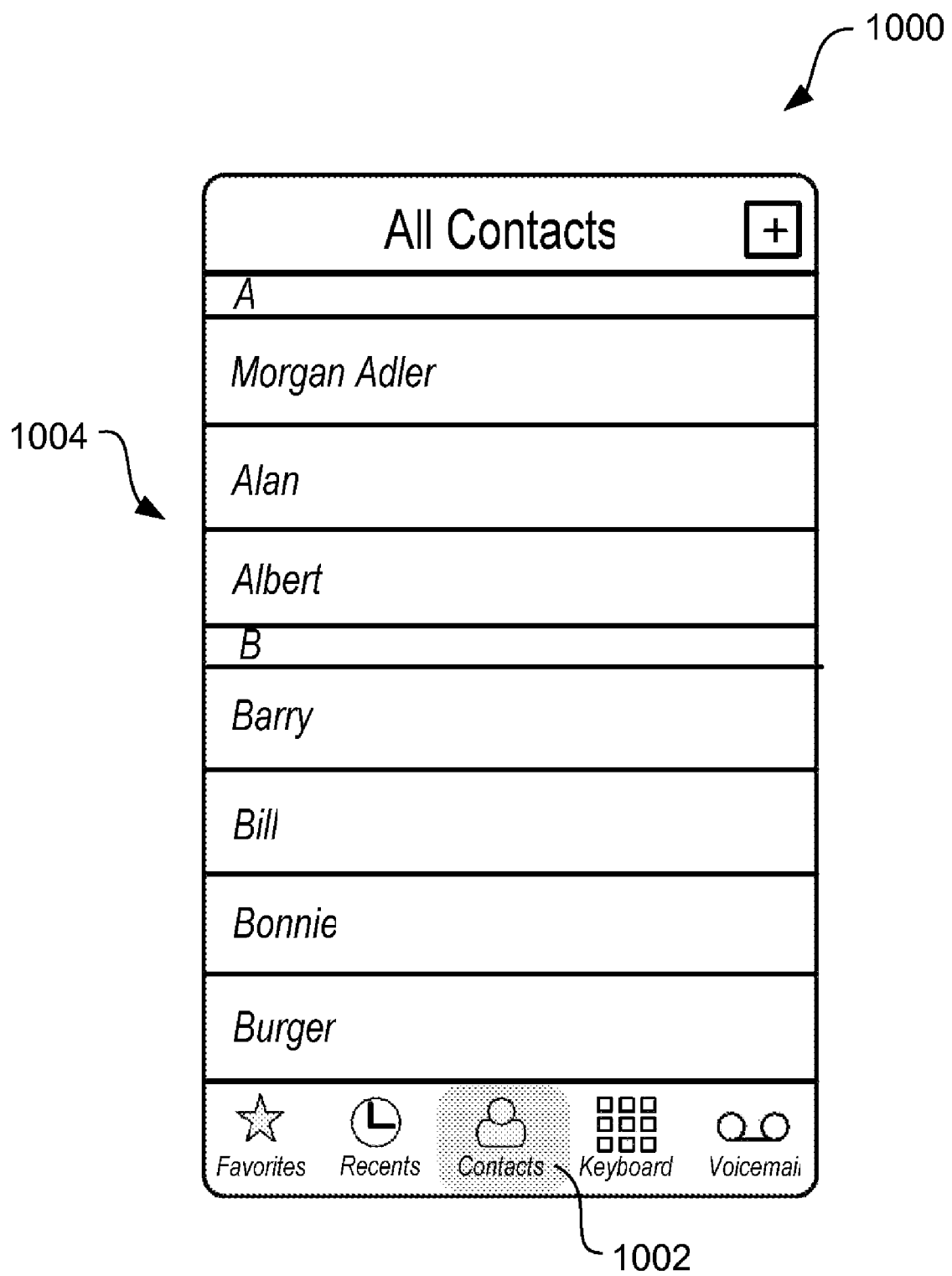
FIGS. 10A-10D are exemplary screens that can be presented on a display according to another embodiment of the invention.

FIG. 10A is an exemplary contacts screen 1000 according to one embodiment of the invention. A "contacts" icon 1002 is visually designated (e.g., highlighted) to indicated that a contact mode is active. When in the contact mode, a list 1004 of contacts is displayed by the contacts screen 800. When a particular contact is selected from the list 804, contact information can be displayed for the selected contact.

Figure 10B:
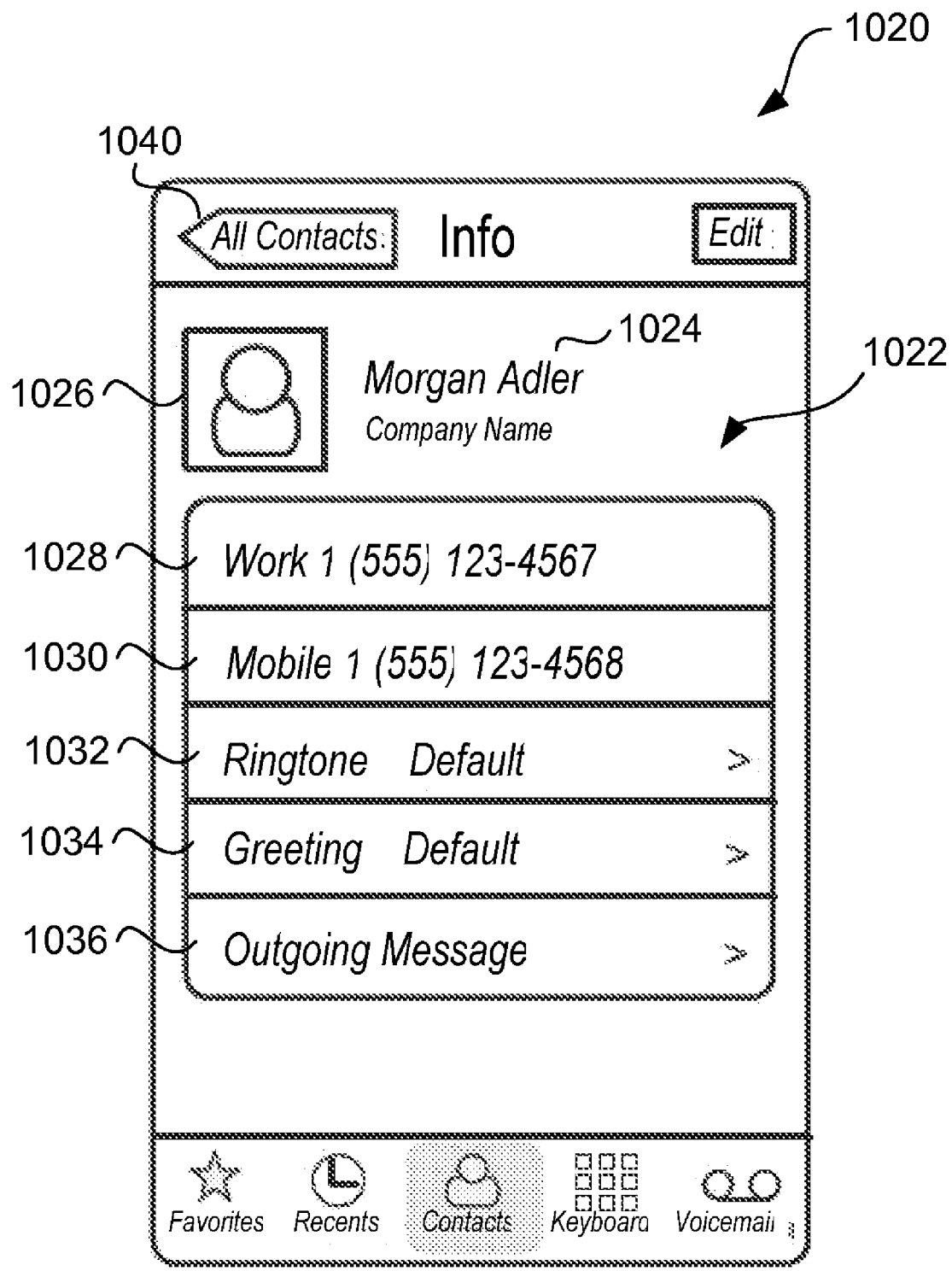

FIG. 10B is an exemplary contact information screen 1020 according to one embodiment of the invention. The content information screen 1020 displays content information 1022. The contact information 1022 includes a contact name 1024, a content picture 1026, a work phone number 1028, a mobile phone number 1030, a ringtone selection 1032, a greeting selection 1034, and an outgoing message selector 1036. As shown in FIG. 10B, the ringtone selection 1032 specifies that a default ringtone is currently selected. The greeting selection 1034 specifies that a default greeting is currently selected. The outgoing message selector 1036 facilitates a user in arranging for one or more outgoing messages to be sent. The contact information screen 1020 can also includes a user control 1040 to navigate back to the contact screen 1000 illustrated in FIG. 10A.

Figure 10C:
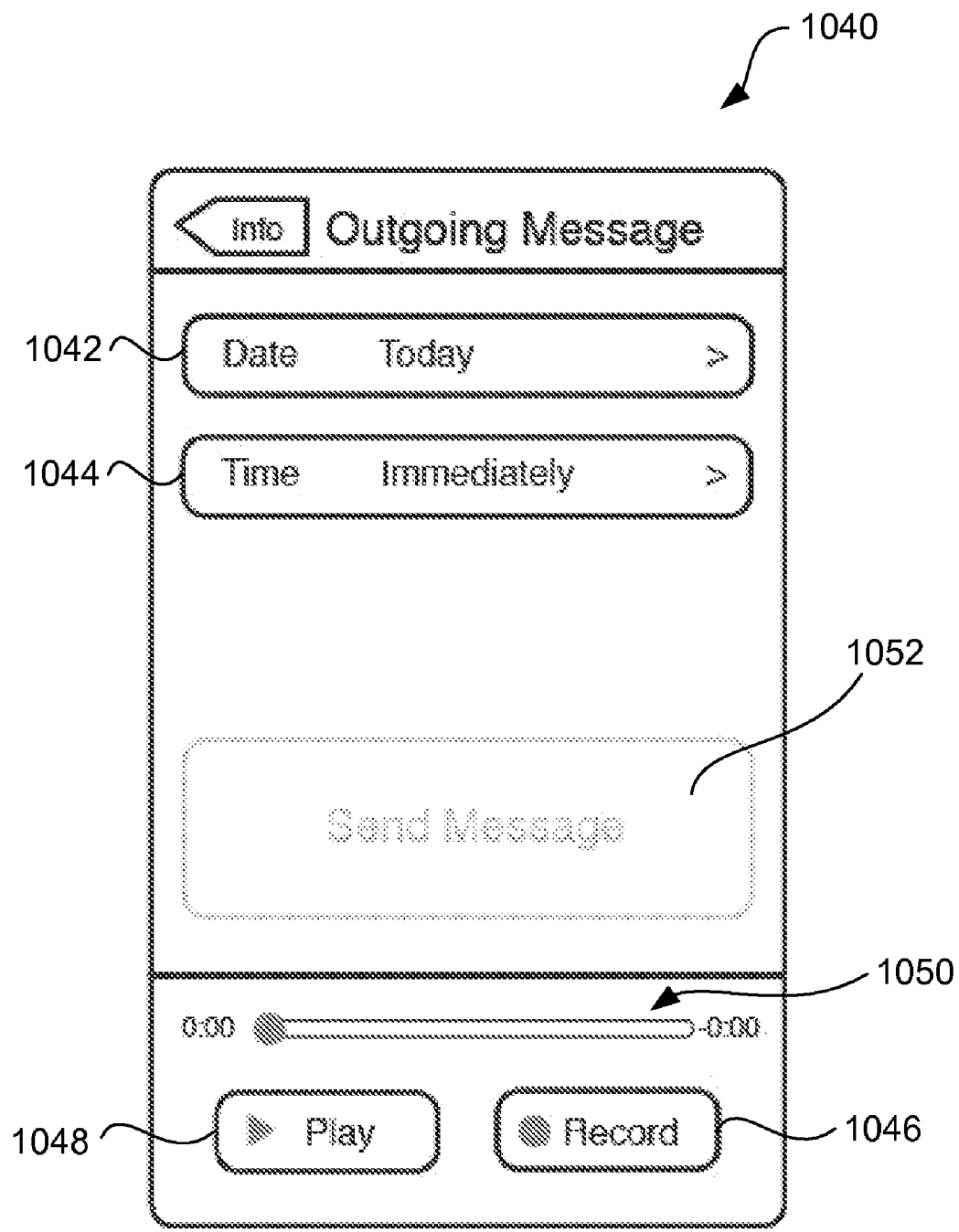

FIG. 10C is an exemplary outgoing message screen 1040 according to one embodiment of the invention. The outgoing message screen 1040 can be displayed when the outgoing message selector 1036 shown in FIG. 10B is selected. The outgoing message screen 1040 displays a date selection 1042 and a time selection 1044. By selecting the data selection 1042, the user can set a date for when an outgoing message is to be sent. For example, as shown in FIG. 10C, the date selection 1042 indicates that the default or currently selected date is "today". By selecting the time selection 1044, the user can set a time for when an outgoing message is to be sent on the selected date. For example, as shown in FIG. 10C, the time selection 1044 indicates that the default or currently selected time is "immediate". Hence, an outgoing message can be sent in accordance with the selected date and time. As a result, an outgoing message can be sent immediately or can be scheduled to be sent at a particular date and time in the future.

The outgoing message screen 1040 can also include a record user control 1046 and a play user control 1048. On selection of the record user control 1046, the user can record an audio recording (e.g., audio message) to be used for an outgoing message being created. The selection of the play user control 1048 can be selected to play back the audio recording (e.g., audio message) of the outgoing message that has been recorded. The outgoing message screen 1040 can also include a playback control 1050 that can allow a user to control playback position when playing back an outgoing message. The playback control 1050 can also indicate a duration of the outgoing message. As shown in FIG. 10C, if no outgoing message has been recorded, a send message control 1052 is disabled since there is no outgoing message to be sent.

Figure 10D:
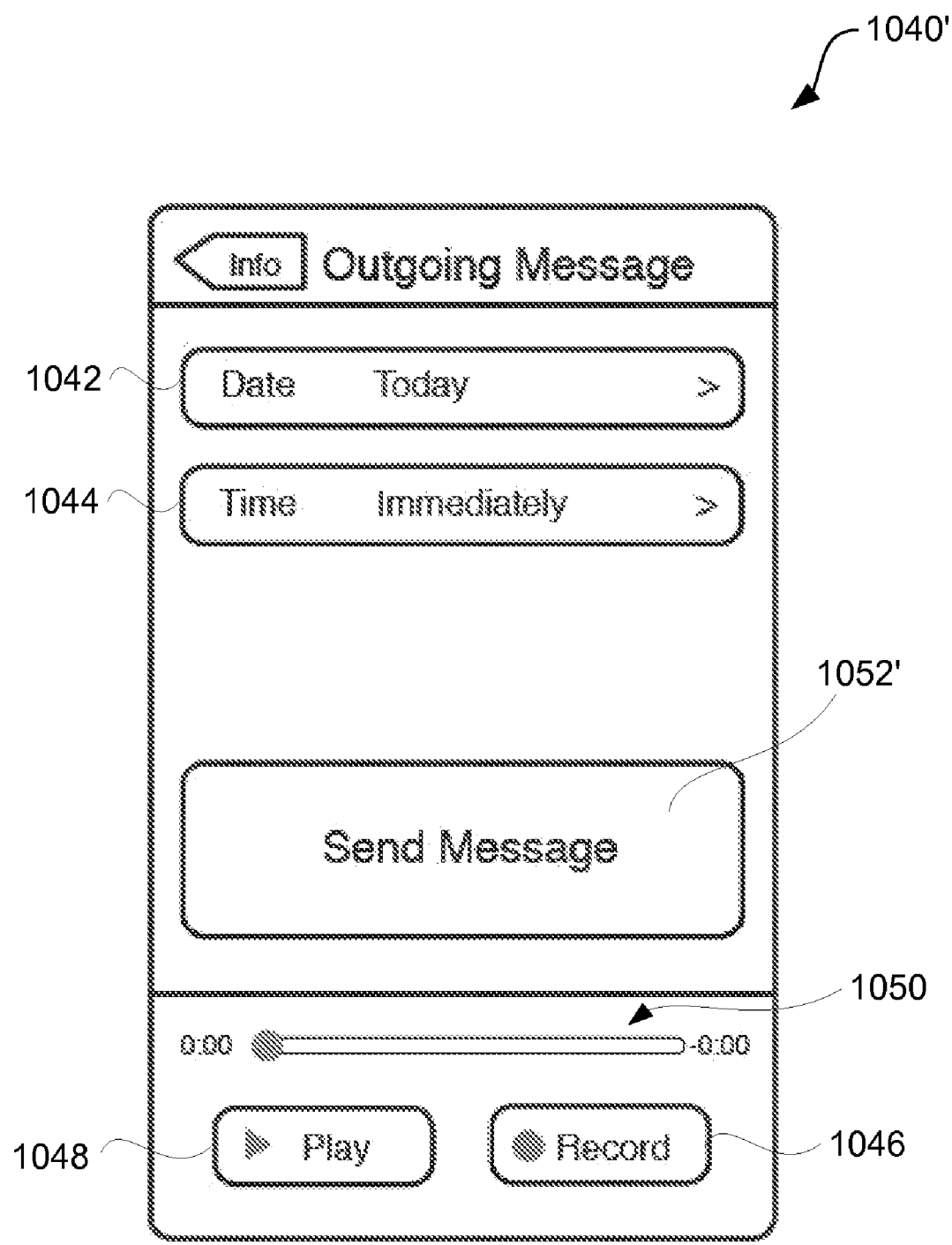

FIG. 10D is an exemplary outgoing message screen 1040' according to one embodiment of the invention. The outgoing message screen 1040' represents an updated version of the outgoing message screen 1040 after an outgoing message has been recorded. Here, as shown in FIG. 10D, the send message control 1052' is enabled because an outgoing message has been recorded and the user is permitted to send the outgoing message.

Although the exemplary screens illustrated in FIGS. 10A-10D are suitable for arranging for a custom audio message (e.g., custom voice message) to be sent to a particular contact. It should be understood that in other embodiment, a custom audio message can be sent to multiple contacts or to other destinations that may not be contacts.

Figure 10E:
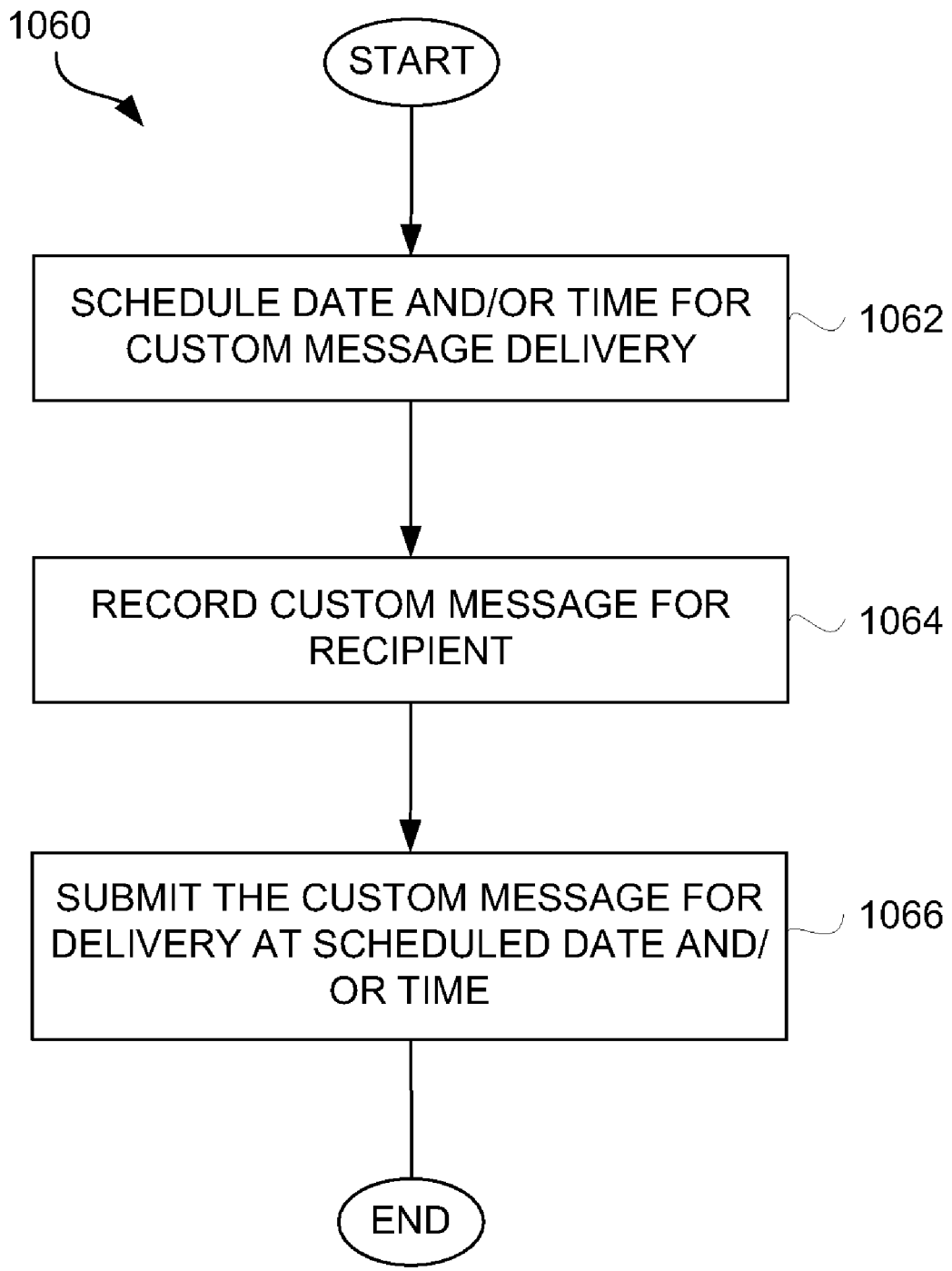
FIG. 10E is a flow diagram of a message delivery process according to one embodiment of the invention.

FIG. 10E is a flow diagram of a message delivery process 1060 according to one embodiment of the invention. The message delivery process 1060 can, for example, be at least partially performed by an electronic device (e.g., mobile communication device) associated with a subscriber (user). In one embodiment, the message delivery process 1060 can produce one or more of the exemplary screens illustrated in FIGS. 10A-10D.

The message delivery process 1060 can begin by scheduling 1062 a date and/or a time for a custom message (e.g., custom audio and/or video message) to be delivered to a recipient. In one implementation, the recipient can be a particular contact associated with the user (e.g., see FIG. 10A). The custom message for the recipient can also be recorded 1064. Thereafter, the custom message can be submitted 1066 for delivery to the recipient at the scheduled date and/or time. In one implementation, the delivery can be performed such that the custom message is delivered as a voicemail to the recipient. In such case, a wireless carrier system can deliver the custom message to a voicemail server associated with the recipient at the scheduled date and/or time. Alternatively, the wireless carrier system could deliver the custom message in advance and instruct the voicemail server to make it available to the recipient at the scheduled date and/or time. In another embodiment, the delivery of the custom message can be performed as an incoming call to the recipient, whereby the custom message is played for the recipient if the call is answered or saved as a voicemail message if the call is not answered.

One example of a custom message that can be delivered in a deferred manner by the message delivery process 1060 is a message that the user wishes to send to a recipient but wants the message delivered at a particular time. For example, if its Joe' birthday in two days and Jane will be out of town then, Jane can record a custom "Happy Birthday" message for Joe and schedule the message to be delivery on Joe's birthday.

Figure 11:
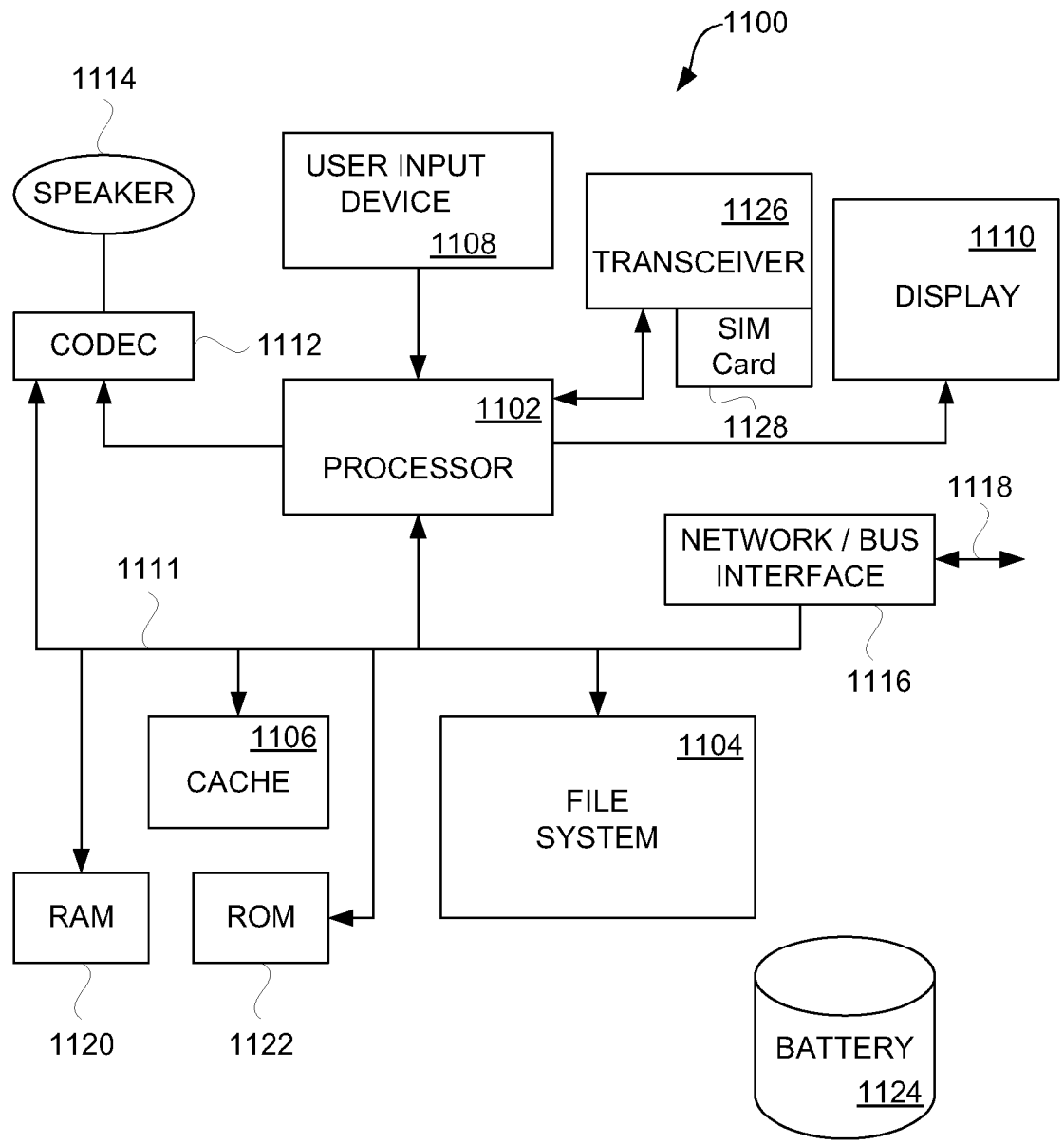
FIG. 11 is a block diagram of a mobile multi-function device according to one embodiment of the invention.

FIG. 11 is a block diagram of a mobile multi-function device 1100 according to one embodiment of the invention. The mobile multi-function device 1100 can include the circuitry of a mobile communication device that can perform some or all of the operations described with reference to FIGS. 1-5 and 7A-10D. The mobile multi-function device 1100 includes hardware and software components to provide at least two functions, namely, a media playback function and a wireless voice communications function. When providing media playback, the mobile multi-function device 1100 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 1100 can operate a mobile telephone (e.g., cellular phone).

The mobile multi-function device 1100 includes a processor 1102 that pertains to a microprocessor or controller for controlling the overall operation of the mobile multi-function device 1100. The mobile multi-function device 1100 stores media data pertaining to media items in a file system 1104 and a cache 1106. In one embodiment, the file system 1104 is implemented by a storage disk or a plurality of disks. In another embodiment, the file system 1104 is implemented by EEPROM or Flash type memory. The file system 1104 typically provides high capacity storage capability for the mobile multi-function device 1100. However, since the access time to the file system 1104 is relatively slow, the mobile multi-function device 1100 can also include a cache 1106. The cache 1106 is, for example, Random-Access Memory (RAM) provided by semiconductor memory. The relative access time to the cache 1106 is substantially shorter than for the file system 1104. However, the cache 1106 does not have the large storage capacity of the file system 1104. Further, the file system 1104, when active, consumes more power than does the cache 1106. The power consumption is often a concern when the mobile multi-function device 1100 is a portable mobile multi-function device that is powered by a battery 1124. The mobile multi-function device 1100 also includes a RAM 1120 and a Read-Only Memory (ROM) 1122. The ROM 1122 can store programs, utilities or processes to be executed in a non-volatile manner. The ROM 1122 can be implemented by an EEPROM or Flash type memory so as to provide writable non-volatile data storage. The RAM 1120 provides volatile data storage, such as for the cache 1106.

In one embodiment, to support wireless voice communications, the mobile multi-function device 1100 includes a transceiver 1126 and a SIM card 1128. The transceiver 1126 supports wireless communication with a wireless network (such as a wireless cellular network). The SIM card 1128 includes an identifier (e.g., SIM identifier) can be used by the mobile multi-function device 1100 to gain access and utilize the wireless network. In other embodiments, a SIM card 1128 is not utilized.

The mobile multi-function device 1100 also includes a user input device 1108 that allows a user of the mobile multi-function device 1100 to interact with the mobile multi-function device 1100. For example, the user input device 1108 can take a variety of forms, such as a button, keypad, dial, etc. Still further, the mobile multi-function device 1100 includes a display 1110 (screen display) that can be controlled by the processor 1102 to display information to the user. The user input device 1108 can also be implemented as a touch-sensitive device apart or integral with the display 1110. A data bus 1111 can facilitate data transfer between at least the file system 1104, the cache 1106, the processor 1102, and the CODEC 1112.

In one embodiment, the mobile multi-function device 1100 serves to store a plurality of media items (e.g., songs) in the file system 1104. When a user desires to have the mobile multi-function device play a particular media item, a list of available media items is displayed on the display 1110. Then, using the user input device 1108, a user can select one of the available media items. The processor 1102, upon receiving a selection of a particular media item, can supply the media data (e.g., audio file) for the particular media item to a coder/decoder (CODEC) 1112. The CODEC 1112 can then produces analog output signals for a speaker 1114. The speaker 1114 can be a speaker internal to the mobile multi-function device 1100 or external to the mobile multi-function device 1100. For example, a headphone or earphone that connects to the mobile multi-function device 1100 would be considered an external speaker.

The mobile multi-function device 1100 can also includes a bus interface 1116 that couples to a data link 1118. The data link 1118 can allow the mobile multi-function device 1100 to couple to a host device (e.g., host computer or power source). The data link 1118 can also provide power to the mobile multi-function device 1100.

The mobile electronic device utilized herein can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

The messages (audio messages, custom greetings, etc.) discussed herein can be audio as noted above. These messages can also be video messages.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that voicemail greetings can be effectively managed from a mobile communication device. Another advantage is that voicemail greetings can be created using a mobile communication device. Still another advantage of the invention is that specific voicemail greetings can be assigned to specific contacts, groups or callers.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method operable on a wireless communication device for assigning a voicemail greeting to a contact, the wireless communication device having a memory configured to store contact data on a plurality of contacts, said method comprising:
   selecting a predetermined contact from the plurality of contacts having contact data stored in the memory;
   displaying a list of a plurality of predetermined voicemail greetings;
   receiving a selection one of the predetermined voicemail greetings to be utilized with respect to an incoming call from the selected predetermined contact; and
   associating the selected one of the predetermined voicemail greetings to the selected predetermined contact so that the selected one of the predetermined voicemail greetings can be utilized with respect to one or more incoming calls from the selected predetermined contact, such that the selected one of the predetermined voicemail greetings is assigned to the selected predetermined contact.

2. A method as recited in claim 1, wherein at least one of the predetermined voicemail greetings is personal to the selected predetermined contact and only made available as a voicemail greeting to the selected contact.

3. A method as recited in claim 1, wherein at least one of the predetermined voicemail greetings is general and available to all of the predetermined contacts associated with the wireless communication device.

4. A method as recited in claim 1, wherein said method further comprises:
   creating a personal voicemail greeting for the selected predetermined contact.

5. A method as recited in claim 4, wherein the personal voicemail greeting that has been created is thereafter displayed in the list of the plurality of predetermined voicemail greetings.

6. A method as recited in claim 4, wherein the personal voicemail greeting that has been created is thereafter displayed in the list of the plurality of predetermined voicemail greetings only if the list of the plurality of predetermined voicemail greetings is being displayed for use with regard to the selected predetermined contact.

7. A method as recited in claim 4, wherein said creating of the voicemail greeting comprises setting an expiration date or time for expiration of the voicemail greeting.

8. A method as recited in claim 1, wherein said method further comprises:
   creating a voicemail greeting using the wireless communication device.

9. A method as recited in claim 1, wherein said method further comprises:
   transmitting the created voicemail greeting to a wireless network provider for use as a voicemail greeting associated with the wireless communication device.

10. A method operable on a wireless communication device for configuring a voicemail greeting, said method comprising:
    displaying a list of a plurality of predetermined voicemail greetings;
    receiving a selection of one of the predetermined voicemail greetings to be utilized with respect to an incoming call; and
    notifying the wireless service provider of the selected one of the predetermined voicemail greetings.

11. A method as recited in claim 10, wherein said method further comprises:
    creating a voicemail greeting using the wireless communication device.

12. A method as recited in claim 11, wherein the personal voicemail greeting that has been created is thereafter displayed in the list of the plurality of predetermined voicemail greetings and available for selection.

13. A method as recited in claim 11, wherein said creating comprises:
    configuring the voicemail greeting to automatically expire.

14. A method as recited in claim 11, wherein said creating comprises:
    limiting the duration of the voicemail greeting being created.

15. A method as recited in claim 11, wherein said method further comprises:
    playing the voicemail greeting for review on the wireless communication device.

16. A method as recited in claim 10, wherein said method further comprises:
    playing any of the voicemail greetings for review on the wireless communication device.

17. A method for providing voicemail greetings to callers, said method comprising:
- receiving an incoming call by a caller and directed to a particular subscriber;
- determining whether a particular one of a plurality of voicemail greetings associated with the particular subscriber has been assigned for use with the caller; and
- playing the particular voicemail greeting for the caller if it is determined that the particular subscriber has assigned the particular voicemail greeting to be used with the caller,
- wherein said determining comprises:
  - determining whether the caller is one of a plurality of predetermined contacts for the particular subscriber; and
  - determining whether the particular subscriber has assigned a particular one of a plurality of voicemail greetings to be associated with the determined one of the predetermined contacts.

18. A method as recited in claim 17, wherein said method further comprises:
- determining a default voicemail greeting.

19. A method as recited in claim 18, wherein said method further comprises:
- playing the default voicemail greeting to the caller if it is determined that the particular subscriber has not assigned the particular voicemail greeting to be used with the caller.

20. A method as recited in claim 18, wherein said method further comprises:
- displaying a visual indication of the selected one of the predetermined voicemail greetings to be used as the default voicemail greeting.

21. A method as recited in claim 17, wherein said method further comprises:
- permitting the caller to record a voice message after playing of the particular voicemail greeting.

22. A method as recited in claim 17, wherein the caller is identified by a caller identifier.

23. A method for providing voicemail greetings to callers, said method comprising:
- receiving an incoming call by a caller and directed to a particular subscriber;
- determining whether a particular one of a plurality of voicemail greetings associated with the particular subscriber has been assigned for use with the caller; and
- playing the particular voicemail greeting for the caller if it is determined that the particular subscriber has assigned the particular voicemail greeting to be used with the caller,
- wherein the caller is one of a plurality of predetermined contacts for the particular subscriber,
- wherein the voicemail greetings includes a general voicemail greeting and a personal voicemail greeting,
- wherein the general voicemail greeting is available for use with any of the predetermined contacts, and
- wherein the personal voicemail greeting is available for use with only the predetermined contact for which the voicemail greeting was originally made.

24. A method for delivering a message to a recipient, said method comprising:
- scheduling a date and/or time for a message to be delivered to the recipient;
- recording, by a user of mobile communication device, an audio and/or video message for the recipient; and
- submitting the audio and/or video message for delivery at the scheduled date and/or time.

25. A graphical user interface for presentation on a display of a mobile communication device, said graphical user interface comprising:
- a greeting screen that presents a plurality of available greetings, said greeting screen including at least a create greeting control configured to assist a user of the mobile electronic device in creating a new greeting;
- a visual designator configured to designate a selected one of the available greetings to be utilized; and
- a greeting creation screen configured to create a new greeting, said greeting creation screen including at least one of (i) an expiration control configured to set an expiration for the new greeting, (ii) a group control configured to select a group of contacts to receive the new greeting, and (iii) a priority control configured to set a priority for the new greeting.

26. A graphical user interface as recited in claim 25, wherein a user input operates to select one of the available greetings to be utilized.

27. A graphical user interface as recited in claim 26, wherein the display is a touch screen, and wherein the user input is provided via the touch screen.

28. A graphical user interface as recited in claim 25, wherein when said create greeting control is selected by the user, said greeting creation screen is displayed on the display of the mobile communication device.

29. A graphical user interface as recited in claim 25, wherein said greeting creation screen further comprises:
- a record user control configured to assist with receiving of an audio recording for the new greeting.

30. A graphical user interface as recited in claim 25, wherein said greeting creation screen further comprises:
- a play user control configured to assist with playing any of the available greetings at the mobile electronic device.

31. A graphical user interface as recited in claim 25, wherein said greeting creation screen further comprises:
- a playback control configured to allow a user of the mobile electronic device to control playback position on playback of a specified one of the available greetings.

32. A graphical user interface as recited in claim 25, wherein said greeting creation screen further comprises:
- an indication of a duration of a specified one of the available greetings.

33. A graphical user interface as recited in claim 25, wherein said graphical user interface further comprises:
- a decline call control configured to enable the user to decline an incoming call to the mobile communication device from a caller and thereby direct the incoming call to voicemail where the selected one of the available greetings is presented to the caller.

34. A graphical user interface as recited in claim 33, wherein said graphical user interface further comprises:
- an accept call control configured to enable the user to accept an incoming call to the mobile communication device from a caller and thereby not direct the incoming call to voicemail.

35. A graphical user interface as recited in claim 25, wherein said greeting screen is automatically displayed on the display when an incoming call is received at the mobile electronic device.

36. A graphical user interface as recited in claim 25, wherein said greeting screen is displayed on the display of the mobile communication device when an incoming call is received.

37. A graphical user interface for presentation on a display of a mobile communication device, said graphical user interface comprising:

a greeting screen that presents a plurality of available greetings, said greeting screen including at least a create greeting control configured to assist a user of the mobile electronic device in creating a new greeting;

a visual designator configured to designate a selected one of the available greetings to be utilized;

a greeting creation screen configured to create a new greeting, said greeting creation screen including at least one of (i) an expiration control configured to set an expiration for the new greeting, (ii) a group control configured to select a group of contacts to receive the new greeting, and (iii) a priority control configured to set a priority for the new greeting; and an outgoing message creation screen configured to record a custom message and schedule delivery of the custom message.

38. A graphical user interface as recited in claim 37, wherein said outgoing message creation screen comprises:

a date and/or time selection control configured to enable selection of a date and/or time for the scheduled delivery of the custom message.

39. A graphical user interface as recited in claim 37, wherein said outgoing message creation screen comprises:

a date and/or time selection control configured to enable selection of a future date and/or time for the scheduled delivery of the custom message, whereby the custom message is thereafter delivered to at least one recipient at the date and/or time for the scheduled delivery.

40. A mobile electronic device, comprising:

a display;

a memory configured to store computer program code and data on a plurality of contacts; and a processor operatively connected to said memory and said display, said processor being configured to assign a voicemail greeting to at least one of the contacts, said processor operable to execute the computer program code to (i) select a predetermined contact; (ii) display a list of a plurality of predetermined voicemail greetings; (iii) receive a selection of one of the predetermined voicemail greetings to be utilized with respect to an incoming call from the selected predetermined contact; and (iv) associate the selected one of the predetermined voicemail greetings to the selected predetermined contact so that the selected one of the predetermined voicemail greetings can be utilized with respect to one or more incoming calls from the selected predetermined contact.

\* \* \* \* \*